US010009092B2

(12) United States Patent
Glottmann

(10) Patent No.: US 10,009,092 B2
(45) Date of Patent: Jun. 26, 2018

(54) MOBILE AD-HOC NETWORK WITH SATELLITE NODE

(71) Applicant: Elbit Systems Land and C4I Ltd., Natania (IL)

(72) Inventor: Oscar Glottmann, Haifa (IL)

(73) Assignee: Elbit Systems Land and C4I Ltd., Natania (IL)

( * ) Notice: Subject to any disclaimer, the term of this patent is extended or adjusted under 35 U.S.C. 154(b) by 217 days.

(21) Appl. No.: 14/889,185

(22) PCT Filed: May 7, 2014

(86) PCT No.: PCT/IL2014/050410
§ 371 (c)(1),
(2) Date: Nov. 5, 2015

(87) PCT Pub. No.: WO2014/181332
PCT Pub. Date: Nov. 13, 2014

(65) Prior Publication Data
US 2016/0099770 A1 Apr. 7, 2016

(30) Foreign Application Priority Data
May 7, 2013 (IL) .......................................... 226218

(51) Int. Cl.
*H04B 7/185* (2006.01)
*H04W 40/24* (2009.01)
(Continued)

(52) U.S. Cl.
CPC ..... *H04B 7/18532* (2013.01); *H04B 7/15557* (2013.01); *H04W 40/24* (2013.01); *H04L 45/46* (2013.01); *H04W 84/18* (2013.01)

(58) Field of Classification Search
None
See application file for complete search history.

(56) References Cited

U.S. PATENT DOCUMENTS 5,987,011 A 11/1999 Toh
6,304,556 B1 10/2001 Haas
(Continued)

FOREIGN PATENT DOCUMENTS

CN 102802140 11/2012
EP 1324532 7/2003
(Continued)

OTHER PUBLICATIONS

International Preliminary Report on Patentability dated Nov. 19, 2015 From the International Bureau of WIPO Re. Application No. PCT/IL2014/050410.
(Continued)

*Primary Examiner* — Christopher Grey

(57) ABSTRACT

A mobile ad-hoc communications network with multi-interface dynamic routing includes multiple mobile nodes with mobile wireless communication and multiple mobile nodes with mobile wireless communication and satellite communication. At least some of the mobile nodes with mobile wireless communication are dynamically-switched between operating as an ordinary node or as a backbone node. At least some of the mobile nodes with mobile wireless communication and satellite communication are dynamically-switched between operating as an ordinary node or as a backbone node. All of the mobile nodes communicate over a dynamically-formed ordinary communication link. Mobile nodes operating as backbone nodes additionally communicate over a dynamically-formed backbone link. Data is routed in the network by an ad-hoc multi-interface dynamic routing which routes data between the mobile nodes by mobile wireless communication and by satellite communication in accordance with respective communication capabilities of the mobile nodes, so as to incorporate satellite communications into the network.

36 Claims, 21 Drawing Sheets

(51) Int. Cl.
*H04B 7/155* (2006.01)
*H04W 84/18* (2009.01)
*H04L 12/715* (2013.01)

(56) References Cited

U.S. PATENT DOCUMENTS

| | | | |
|---|---|---|---|
| 6,791,949 | B1 | 9/2004 | Ryu et al. |
| 7,281,057 | B2 | 10/2007 | Cain |
| 8,031,605 | B2 | 10/2011 | Oyman et al. |
| 8,134,950 | B2 | 3/2012 | Pun |
| 8,175,101 | B2 | 5/2012 | Park et al. |
| 8,179,837 | B2 | 5/2012 | Kulkarni et al. |
| 8,233,905 | B2 | 7/2012 | Vaswani et al. |
| 2003/0053424 | A1* | 3/2003 | Krishnamurthy, Sr. ............ H04B 7/18563 370/316 |
| 2003/0202524 | A1 | 10/2003 | Conner et al. |
| 2003/0235175 | A1 | 12/2003 | Naghian et al. |
| 2005/0099943 | A1 | 5/2005 | Naghian et al. |
| 2005/0152305 | A1 | 7/2005 | Ji et al. |
| 2007/0115816 | A1 | 5/2007 | Sinivaara |
| 2008/0198824 | A1 | 8/2008 | Wu et al. |
| 2008/0247353 | A1 | 10/2008 | Pun |
| 2011/0200026 | A1 | 8/2011 | Ji et al. |
| 2013/0034031 | A1 | 2/2013 | Sherman et al. |
| 2013/0100942 | A1 | 4/2013 | Rudnick et al. |

FOREIGN PATENT DOCUMENTS

| | | |
|---|---|---|
| WO | WO 03/017581 | 2/2003 |
| WO | WO 2007/122620 | 11/2007 |
| WO | WO 2014/181332 | 11/2014 |

OTHER PUBLICATIONS

International Search Report and the Written Opinion dated Aug. 13, 2014 From the International Searching Authority Re. Application No. PCT/IL2014/050410.

Office Action and Search Report dated Mar. 19, 2014 From the Israel Patent Office Re. Application No. 226218 and Its Translation Into English.

Office Action dated Aug. 4, 2014 From the Israel Patent Office Re. Application No. 226218 and Its Translation Into English.

Geetha et al. "A Comparative Study of Gateway Discovery Protocol in MANET", International Journal of Computer Applications, 11(2): Dec. 16-22, 2010.

Geetha et al. "A Survey of Hybrid Routing Protocol for Interconnecting Mobile Ad Hoc Network and Internet", International Journal of Scope of Computer Research, 1(1): 001-009, Nov. 2012.

Iapichino et al. "A Mobile Ad-Hoc Satellite and Wireless Mesh Networking Approach for Public Safety Communications", 10th International Workshop on Signal Processing for Space Communications, SPSC 2008, Rhodes Island, USA, Oct. 6-8, 2008, P.1-8, 2008. Para VI. Conclusion.

Jaikaeo et al. "Adaptive Backbone-Based Multicast for Ad Hoc Networks", IEEE International Conference on Communications, ICC 2002, 5: 3149-3155, 2002.

Lin "Mobile Ad-Hoc Network Routing Protocols: Methodologies Applications", Dissertation Submitted to the Faculty of the Virginia Polytechnic Institute and State University in Partial Fulfillment of the Requirements for the Ph.D. in Computer Engineering, 271 P., Mar. 19, 2004. Abstract, P.7-8, 10, 218-219, Fig.2.6.

Wells "A Network Mobility Survey and Comparison With a Mobile IP Multiple Home Address Extension", Thesis Submitted to the Faculty of the Virginia Polytechnic Institute and state University in Partial Fulfillment of the Requirements for the Degree of Masters of Science in Computer Engineering, 142 P., Jul. 17, 2003.

Supplementary European Search Report and the European Search Opinion dated Dec. 1, 2016 From the European Patent Office Re. Application No. 14795172.7. (8 Pages).

Reissued Examination Report dated Jan. 12, 2018 From the Australian Government, IP Australia Re. Application No. 2014264227. (4 Pages).

\* cited by examiner

MOBILE AD-HOC NETWORK WITH SATELLITE NODE

RELATED APPLICATIONS

This application is a National Phase of PCT Patent Application No. PCT/IL2014/050410 having International filing date of May 7, 2014, which claims the benefit of priority of Israel Patent Application No. 226218 filed on May 7, 2013. The contents of the above applications are all incorporated by reference as if fully set forth herein in their entirety.

FIELD AND BACKGROUND OF THE INVENTION

The present invention, in some embodiments thereof, relates to a mobile ad-hoc network with dual-type backbone nodes, and, more particularly, but not exclusively, to a mobile ad-hoc network with backbone nodes having satellite communication capabilities.

A mobile wireless/radio ad-hoc network (also denoted herein a MANET) is a self-configuring network of wireless mobile devices without a fixed infrastructure. The wireless devices forming the network (denoted nodes) communicate between each other directly or via other nodes (i.e., a node performs the operation of a router). Nodes may leave or join the network. Since nodes may be mobile, the topology of the network frequently changes. The group of nodes with which a given node is in direct (one-hop) communication changes frequently. Consequently, routes for transmitting messages between nodes must be updated dynamically to ensure efficient and reliable data transmission between nodes. Other constraints (such as hills, buildings, weather etc.) may affect the node's effective range.

Typically each node in a MANET has a unique identification associated therewith. This unique identification enables each node in the network to send a message to another node in the network.

MANET efficiency and performance typically decreases as a function of number of nodes and hops, as well as with throughput increase. Multicast transmissions going through multiple nodes and hops further decrease MANET efficiency. This can lead to bottlenecks and traffic congestion. Mobility and terrain make it hard to predict network congestion bottlenecks.

Many protocols for MANET data routing have been proposed and evaluated based on measures such as the packet drop rate, the overhead introduced by the routing protocol, end-to-end packet delays, network throughput etc.

For purposes of better understanding some embodiments of the present invention, as illustrated in FIGS. 3A-13 of the drawings, reference is first made to the construction and operation of a MANET as illustrated in FIGS. 1 and 2.

FIG. 1 is a simplified diagram of an unclustered mobile ad-hoc network 100. MANET 100 includes nodes (e.g. nodes 110.1-110.4), where each node has a maximal transmit range (as illustrated by dashed circle around node 110.1). The node's transmit range typically varies over time due to the node's mobility and other factors. A line between two nodes (such as between 110.1 and 110.2) indicates that the nodes communicate directly with each other (one-hop). For example, nodes 110.1 and 110.2 are one-hop neighbors. Node 110.3 is a two-hop neighbor of node 110.1, with data being forwarded by node 110.2 (which is a one-hop neighbor of both). It can be seen that data transmission between multi-hop nodes may become complex.

FIG. 2 is a simplified diagram of a clustered mobile ad-hoc network 200. In MANET 200 nodes are dynamically divided into clusters (e.g. the nodes included in 220.1), each cluster having a respective node which has temporarily assumed the role of a super-node (e.g. 230.1), acting as a temporary cluster head for the other neighboring nodes in addition to other node functions. The super-nodes communicate with each other over a separate backbone network (formed from backbone links between super-nodes). Nodes within a given cluster communicate as discussed for FIG. 1. Nodes in separate clusters communicate via the backbone nodes, thus reducing the number of hops required for data transfer between remote nodes and the overall overhead on the MANET. As MANET nodes are mobile and may change location, the status of a node as an ordinary node or as a super-node may change dynamically, in accordance with current network topology, which is affected amongst other factors by the location of all the MANET nodes as well as the terrain topography. As the node operating modes change (e.g. ordinary node becomes super-node and vice-versa), so changes the topology of the backbone link (e.g. backbone link becomes an ordinary link and vice-versa).

International Patent Application Publication No. WO2007122620 by Temelman et al. presents a wireless ad hoc network comprising a plurality of nodes, where each of the nodes has a dynamically determined role. A portion of the nodes are designated with the role of super-nodes and form the routing backbone of the network. Each of the nodes attempts to communicate with at least a minimal number of one hop super-node neighbors. Temelman's network, however, is limited in its capability to provide a geographically wide-spread network in an area having interfering topography.

Additional background art includes:
1) European Patent Application Publication No. 1324532A2 to Liu et al.;
2) Publication to Jaikaeo et al, entitled "Adaptive Backbone-Based Multicast for Ad Hoc Networks";
3) U.S. Pat. No. 6,791,949 by Ryu et al;
4) U.S. Pat. No. 8,031,605 by Oyman et al;
5) U.S. Pat. No. 8,179,837 by Kulkarni et al;
6) U.S. Pat. No. 7,281,057 by Cain Joseph Bibb;
7) U.S. Pat. No. 8,175,101 by Park et al;
8) U.S. Pat. No. 8,233,905 by Vawani et al;
9) U.S. Patent Application Publication No. 2003/0235175 by Naghian et al;
10) U.S. Pat. No. 6,304,556 by Haas;
11) U.S. patent application Publication No. by Sinivaara;
12) U.S. Patent Application Publication No. 2005/0099943 by Naghian et al;
13) U.S. Patent Application Publication No. 2005/0152305 by Ji et al;
14) U.S. Patent Application Publication No. 2008/0198824 by Wu et al;
15) U.S. Pat. No. 5,987,011 by Toh; and
16) U.S. Patent Application Publication No. 2011/0200026 by Ji et al.

SUMMARY OF THE INVENTION

According to an aspect of some embodiments of the present invention, a mobile ad-hoc network includes mobile wireless nodes which communicate without a fixed infrastructure. Data is forwarded in from an originating node to a destination node along a series of one-hop connections between other mobile nodes in the network. The network uses an ad-hoc routing protocol to dynamically select the desired route for data being transferred between mobile nodes. Each node continuously maintains the information required to properly route traffic without requiring routing instructions from a fixed infrastructure.

The network includes two types of links, an ordinary link and a backbone link. Each mobile node dynamically selects its own role as an ordinary node or as a backbone node according to current conditions. When operating as an ordinary node, the node communicates with all other neighboring nodes over the ordinary link. When operating as a backbone node the node may communicate with other nodes over the ordinary link or the backbone link, in accordance with the routing protocol. Optionally, backbone nodes serve as cluster heads, so that data is transferred from one cluster to another over the backbone link. Node type self-selection (as ordinary or backbone) is dynamic, and the nodes switch back and forth between ordinary and backbone as required.

All nodes are capable of communicating with neighboring nodes over a mobile wireless communication link. Some nodes additionally have additional satellite communication capabilities, and are capable of communicating with other satellite-capable nodes over a satellite link in accordance with the ad-hoc routing protocol. This integrates a satellite-portion into the ordinary and/or backbone links of the mobile-ad hoc network.

There are multiple manners for two nodes with satellite communication capabilities to communicate. These include some or all of:

i) When both nodes are ordinary nodes—by satellite communication over the ordinary link and/or by mobile wireless communication over the ordinary link;

ii) When one of the nodes is ordinary and the other node is backbone—by satellite communication over the ordinary link and/or by mobile wireless communication over the ordinary link; and iii) When both nodes are backbone nodes—by satellite communication over the backbone link and/or by mobile wireless communication over the backbone link and/or by satellite communication over the ordinary link and/or by mobile wireless communication over the ordinary link.

Optionally data is transferred between the two nodes in multiple manners simultaneously. The ad-hoc routing protocol determines which manner is used for the transmission of specific data.

The ad-hoc routing takes into account the capabilities of each node, including whether the node is capable of satellite communication and the current node status (as backbone or ordinary). For a node with satellite communication, data may be routed over the mobile wireless interface, the satellite communication interface or simultaneously over both interfaces.

The routing protocol may be any protocol which is suitable for a mobile ad-hoc network, and in which:

A) The ad-hoc network includes an ordinary link (communicated over by both ordinary and backbone nodes) and a backbone link which is communicated over only by backbone nodes. Nodes may switch between operating as an ordinary node or as a backbone node, based on current network conditions and other factors. It is noted that the terms "ordinary link" and "backbone link" do not indicate the form of wireless communication (also denoted type of wireless communication) used in a given link (e.g. radio, satellite, microwave, etc.). Both the ordinary and backbone links may incorporate multiple forms of wireless communication.

B) When data is being routed through a node capable of multiple forms of communication (e.g. mobile wireless and satellite communications), the routing protocol dynamically selects the form or forms of communication which are used for forwarding data at a given time.

Some embodiments of the present invention provide a mobile ad-hoc network (MANET) enabling communication between mobile nodes, and which incorporates a backbone link connecting between nodes currently designated as backbone nodes. The backbone nodes are assigned dynamically from the nodes which are currently active on the network. At least some of the mobile nodes include at least two forms of wireless communication within the same MANET network, thereby enabling connectivity via multiple types of wireless communication simultaneously. These communication types include at least: a first form of wireless communication which enables direct communication between the mobile units and a second form of wireless communication with differing properties (such as range, data rate, delay, throughput, etc. . . . ) which enables expanding the backbone network (and possibly links between backbone nodes and other MANET nodes) to include multiple types of wireless communication links within the same MANET network. In some embodiments the MANET includes additional forms of wireless communication, thus expanding the MANET communication capabilities even further. In some embodiments the second form of communication is satellite communication (SATCOM), which may be used to incorporate satellite communication into the backbone link. Additionally, mobile nodes and/or non-mobile nodes (also denoted fixed nodes) may serve as gateways to external networks by transferring data between the external network and mobile nodes within the MANET network. Communication between MANET mobile nodes and gateway nodes may utilize satellite communication and/or other long range wireless communication types over the backbone link.

According to an aspect of some embodiments of the present invention there is provided a mobile ad-hoc communications network with multi-interface dynamic routing includes multiple mobile nodes with mobile wireless communication and multiple mobile nodes with mobile wireless communication and satellite communication. At least some of the mobile nodes with mobile wireless communication are dynamically-switched between operating as an ordinary node or as a backbone node. At least some of the mobile nodes with mobile wireless communication and satellite communication are dynamically-switched between operating as an ordinary node or as a backbone node. All of the mobile nodes communicate over a dynamically-formed ordinary communication link. Mobile nodes operating as backbone nodes additionally communicate over a dynamically-formed backbone link. Data is routed in the network by an ad-hoc multi-interface dynamic routing which routes data between the mobile nodes by mobile wireless communication and by satellite communication in accordance with respective communication capabilities of the mobile nodes, so as to incorporate satellite communications into the network.

According to some embodiments of the invention, the multi-interface dynamic routing routes data between the backbone nodes by mobile wireless communication and by satellite communication over the backbone link, so as to incorporate satellite communications into the backbone link.

According to some embodiments of the invention, the network further includes a node on-board a satellite, configured for satellite communication with the mobile nodes in accordance with the multi-interface dynamic routing.

According to some embodiments of the invention, the mobile wireless communication capabilities enable direct communication between the mobile nodes.

According to some embodiments of the invention, the satellite communication capabilities enable satellite communication between a backbone node and an ordinary node.

According to some embodiments of the invention, wherein the satellite communication capabilities enable satellite communication between a pair of ordinary nodes.

According to some embodiments of the invention, selection of a respective mobile node operation as ordinary or backbone is performed dynamically in accordance with a current condition of the network.

According to some embodiments of the invention, the mobile node is configured for dynamic self-selection of the mobile node operation as ordinary or backbone.

According to some embodiments of the invention, the multi-interface dynamic routing routes data between backbone nodes of topographically separate portions of the network over the satellite link.

According to some embodiments of the invention, the network includes at least one gateway node having satellite communication capabilities, configured for operation as a gateway between the mobile nodes and an external network in accordance with the multi-interface dynamic routing.

According to some embodiments of the invention, the gateway node is a fixed node configured for communication with mobile backbone nodes over the satellite link.

According to some embodiments of the invention, the gateway node is a mobile node having satellite communication capabilities, configured for operation as a gateway between the mobile nodes and a mobile external network in accordance with the multi-interface dynamic routing.

According to some embodiments of the invention, the mobile backbone nodes are in single-hop communication with respective dynamically changing sets of ordinary nodes.

According to some embodiments of the invention, a backbone node and the respective set of ordinary nodes are configured as a cluster.

According to some embodiments of the invention, data sent from an originating node to a destination node is forwarded over the backbone link, so as to reduce a number of hops required for transmission of data from the originating node to the destination node.

According to some embodiments of the invention, for a node having satellite communication capabilities, the routing protocol routes data simultaneously by mobile wireless communication and by satellite communication.

According to some embodiments of the invention, at least one of the mobile nodes includes:

i) a topology processor, configured for monitoring network topology and routing data transmission in accordance with the multi-interface dynamic routing;

ii) a wireless transceiver in association with the topology processor, configured for direct communication with others of the mobile nodes having mobile wireless communication capabilities; and iii) a satellite transceiver in association with the topology processor, configured for satellite communication with others of the mobile nodes having satellite communication capabilities.

According to some embodiments of the invention, the topology processor is configured to select current node operation as an ordinary node or as a backbone node.

According to some embodiments of the invention, topology processor includes a network routing monitor configured for maintaining a routing protocol between network nodes.

According to some embodiments of the invention, the topology processor includes a backbone routing monitor configured for maintaining a routing protocol between backbone nodes of the network.

According to some embodiments of the invention, the topology processor includes a local routing monitor configured for maintaining a routing protocol within a cluster of nodes.

According to an aspect of some embodiments of the present invention there is provided a mobile node for communicating within a mobile ad-hoc network. The network is for communication between multiple mobile nodes over both mobile and backbone communication links in accordance with a multi-interface dynamic network routing. The node includes:

i) a topology processor, configured for monitoring network topology and for routing data transmission by the node in accordance with an ad-hoc multi-interface dynamic routing. The ad-hoc multi-interface dynamic routing routes data by mobile wireless communication and by satellite communication in accordance with respective communication capabilities of the mobile node;

ii) a wireless transceiver in association with the topology processor, configured for direct communication with others of the mobile nodes over the mobile communication link; and iii) a satellite transceiver in association with the topology processor, configured for communication with mobile nodes over a satellite link.

The mobile node is self-selecting between operation as an ordinary node and as a backbone node. Operation as a backbone node enables communication over both of the mobile and backbone communication links. Operation as an ordinary node enables communication over the mobile communication link and disables communication over the backbone communication link.

According to an aspect of some embodiments of the present invention there is provided a method for node self-management in a mobile ad-hoc communications network with multi-interface dynamic routing. The network includes multiple mobile nodes with both mobile wireless and satellite communication capabilities. The method includes:

A) determining node communication capabilities;

B) selecting a node operating mode in accordance with the communication capabilities and current network topology, wherein the node operating mode is in backbone mobile node operation or ordinary node operation;

C) if the selected operating mode is backbone mobile node operation:

i) identifying one-hop neighboring backbone nodes and respective communication capabilities of the neighboring backbone nodes;

ii) establishing communication over a satellite portion of a backbone link to one-hop satellite-capable backbone nodes; and iii) establishing communication over a mobile wireless portion of the backbone link to others of the identified one-hop backbone nodes;

and

D) if the selected operating mode is ordinary mobile node operation, establishing mobile wireless communication with one-hop mobile nodes in accordance with a current ad-hoc multi-interface dynamic routing.

According to some embodiments of the invention, the method further includes routing data by the node using mobile wireless communication and satellite communication, wherein for each data packet the multi-interface dynamic routing respectively selects mobile wireless communication or satellite communication in accordance with at least one of: network topography and data type.

According to some embodiments of the invention, the method further includes: if the selected operating mode is ordinary mobile node operation, disabling communication over the backbone link.

According to some embodiments of the invention, the method further includes: if the selected operating mode is ordinary mobile node operation, establishing satellite wireless communication with ordinary mobile nodes in accordance with the current dynamic routing.

According to some embodiments of the invention, the method further includes dynamically updating the network topology.

According to some embodiments of the invention, the method further includes notifying other network nodes of a current node status.

According to an aspect of some embodiments of the present invention there is provided a mobile ad-hoc communications network with multi-interface dynamic routing. The network includes multiple mobile nodes configured for communication over a mobile wireless link in accordance with a multi-interface dynamic routing. Each of the mobile nodes is configured for communication by a first form of wireless communications. At least two of the mobile nodes are configured for communication by both the first form of wireless communication and a second form of wireless communication, the first form and the second form having differing respective communication capabilities. Some of the mobile nodes are dynamically-switchable between operation as an ordinary node or as a backbone node, wherein the mobile nodes communicate with one-hop neighboring nodes over a dynamically-formed ordinary communication link and the mobile nodes operating as backbone nodes additionally communicate over a dynamically-formed backbone link. Data transfer between the mobile nodes utilizes both of the first and second forms of wireless communication in accordance with the multi-interface dynamic routing and respective forms of communication of the mobile nodes, so as to incorporate at least two forms of wireless communication into the network.

According to some embodiments of the invention, the first and second forms of communication have different respective data-transfer capacities.

According to some embodiments of the invention, the multi-interface dynamic routing of the network is in accordance with data transfer requirements of transmitted data and with the data transfer capabilities of the first and second forms of wireless communication.

According to some embodiments of the invention, the first form of wireless communication is for direct communication between the mobile nodes.

According to some embodiments of the invention, the network further includes at least one gateway node configured for operation as a gateway between the mobile nodes and an external network in accordance with the multi-interface dynamic routing.

According to some embodiments of the invention, the gateway node is a fixed node is configured for communication with mobile backbone nodes over the backbone link.

According to some embodiments of the invention, the gateway node is a mobile node configured for operation as a gateway between the mobile nodes and a mobile external network in accordance with the multi-interface dynamic routing.

According to some embodiments of the invention, at least two of the mobile nodes further include satellite communication capabilities, so as to incorporate satellite communications into the network in accordance with the multi-interface dynamic routing.

According to an aspect of some embodiments of the present invention there is provided a mobile ad-hoc communications network with multi-interface dynamic routing. The mobile ad-hoc communications network includes a plurality of mobile nodes configured for mobile wireless communication in accordance with the multi-interface dynamic routing, at least two of the mobile nodes having both mobile wireless and satellite communication capabilities. Two or more of the mobile nodes are dynamically-switchable between operation as an ordinary node or as a backbone node. Both ordinary and backbone mobile nodes are configured to communicate over an ordinary communication link. Mobile nodes communicate with neighboring nodes over a dynamically-formed ordinary communication link. Mobile nodes operating as backbone nodes additionally communicate over a dynamically-formed backbone link. Mobile nodes having satellite communication capabilities may communicate over a satellite link in accordance with the multi-interface dynamic routing, so as to incorporate satellite communications into the network.

According to some embodiments of the invention, backbone nodes having satellite communication capabilities may perform satellite communication over the backbone link in accordance with the multi-interface dynamic routing, so as to incorporate a satellite portion into the backbone link.

According to some embodiments of the invention, the network further includes a node on-board a satellite which performs satellite communication with the mobile nodes in accordance with the multi-interface dynamic routing.

According to some embodiments of the invention, the mobile wireless communication capabilities enable direct communication between the mobile nodes.

According to some embodiments of the invention, the satellite communication capabilities enable satellite communication between a backbone node and an ordinary node.

According to some embodiments of the invention, the satellite communication capabilities enable satellite communication between a pair of ordinary nodes.

According to some embodiments of the invention, selection of a respective mobile node operation as ordinary or backbone is performed dynamically in accordance with a current condition of the network.

According to some embodiments of the invention, the mobile node performs dynamic self-selection of the mobile node operation as ordinary or backbone.

According to some embodiments of the invention, the multi-interface dynamic routing routes data between backbone nodes of topographically separate portions of the network over the satellite link.

According to some embodiments of the invention, the network further includes at least one gateway node having satellite communication capabilities, which operates as a gateway between the mobile nodes and an external network in accordance with the multi-interface dynamic routing.

According to some embodiments of the invention, a gateway node is a fixed node which communicates with mobile backbone nodes over the satellite link.

According to some embodiments of the invention, a gateway node is a mobile node having satellite communication capabilities, which operates as a gateway between the mobile nodes and a mobile external network in accordance with the multi-interface dynamic routing.

According to some embodiments of the invention, the mobile backbone nodes are in single-hop communication with respective dynamically changing sets of ordinary nodes.

According to some embodiments of the invention, a backbone node and the respective set of ordinary nodes form a cluster.

According to some embodiments of the invention, data sent from an originating node to a destination node is forwarded over the backbone link, so as to reduce a number of hops required for transmission of data from the originating node to the destination node.

According to some embodiments of the invention, at least one of the mobile nodes includes:
 a) a topology processor for monitoring network topology and routing data transmission in accordance with the dynamic routing;
 b) a wireless transceiver in association with the topology processor, for direct communication with others of the mobile nodes; and
 c) a satellite transceiver in association with the topology processor, for satellite communication with others of the mobile nodes having satellite communication capabilities.

According to some embodiments of the invention, the topology processor selects current node operation as an ordinary node or as a backbone node.

According to some embodiments of the invention, the topology processor includes a network routing monitor for maintaining a routing protocol between network nodes.

According to some embodiments of the invention, the topology processor includes a backbone routing monitor for maintaining a routing protocol between backbone nodes of the network.

According to some embodiments of the invention, the topology processor includes a local routing monitor for maintaining a routing protocol within a cluster of nodes.

According to an aspect of some embodiments of the present invention there is provided a mobile node for communicating within a mobile ad-hoc network. The mobile ad-hoc network routes data between multiple mobile nodes over both a mobile communication link and a backbone communication link in accordance with a multi-interface dynamic network routing. The node includes:
 a) a topology processor, for monitoring network topology and routing data transmission in accordance with a current network routing;
 b) a wireless transceiver in association with the topology processor, for direct communication with others of the mobile nodes over the mobile communication link; and
 c) a satellite transceiver in association with the topology processor, for communication with mobile nodes over a satellite link.

The mobile node is self-selecting between operation as an ordinary node and as a backbone node. Operation as a backbone node enables communication over both the mobile and the backbone communication links. Operation as an ordinary node enables communication over the mobile communication link and disables communication over the backbone communication link.

According to an aspect of some embodiments of the present invention there is provided a method for node self-management in a mobile ad-hoc communications network with multi-interface dynamic routing. The network includes multiple mobile nodes. The mobile node has both mobile wireless and satellite communication capabilities. The method includes:
 a) determining node communication capabilities;
 b) selecting a node operating mode in accordance with the communication capabilities and current network topology; and
 c) if the selected operating mode is backbone mobile node operation:
  i) identifying one-hop neighboring backbone nodes and respective communication capabilities of the neighboring backbone nodes;
  ii) establishing communication over a satellite portion of a backbone link to one-hop satellite-capable backbone nodes; and
  iii) establishing communication over a mobile wireless portion of the backbone link to others of the identified one-hop backbone nodes;
and if the selected operating mode is ordinary mobile node operation, establishing mobile wireless communication with one-hop mobile nodes in accordance with a current dynamic routing.

According to some embodiments of the invention, the method further includes: if the selected operating mode is ordinary mobile node operation, disabling communication over the backbone link.

According to some embodiments of the invention, the method further includes: if the selected operating mode is ordinary mobile node operation, establishing satellite wireless communication with ordinary mobile nodes in accordance with the current dynamic routing.

According to some embodiments of the invention, the method further includes: dynamically updating the network topology.

According to some embodiments of the invention, the method further includes: notifying other network nodes of a current node status.

According to an aspect of some embodiments of the present invention there is provided a mobile ad-hoc communications network with multi-interface dynamic routing. The network includes multiple mobile nodes for communication over a mobile wireless link in accordance with the multi-interface dynamic routing. Each of the mobile nodes is capable of communication by a first form of wireless communications. At least two of the mobile nodes are capable of communication by both two forms of wireless communication. The two forms of wireless communication have differing respective communication capabilities. Two or more of the mobile nodes are dynamically-switchable between operation as an ordinary node or as a backbone node. The mobile nodes communicate with one-hop neighboring nodes over a dynamically-formed ordinary communication link. Mobile nodes operating as backbone nodes additionally communicate over a dynamically-formed backbone link. Data transfer between the mobile nodes utilizes both forms of wireless communication in accordance with the multi-interface dynamic routing, so as to incorporate at least two forms of wireless communication into the network.

According to some embodiments of the invention, the first and second forms of communication have different respective data-transfer capacities.

According to some embodiments of the invention, the multi-interface dynamic routing of the network is in accordance with data transfer requirements of transmitted data and with the data transfer capabilities of the first and second forms of wireless communication.

According to some embodiments of the invention, the first form of wireless communication is for direct communication between the mobile nodes.

According to some embodiments of the invention, the network further includes at least one gateway node operating as a gateway between the mobile nodes and an external network in accordance with the multi-interface dynamic routing.

According to some embodiments of the invention, the gateway node is a fixed node is for communication with mobile backbone nodes over the backbone link.

According to some embodiments of the invention, the gateway node is a mobile node for operation as a gateway between the mobile nodes and a mobile external network in accordance with the multi-interface dynamic routing.

According to some embodiments of the invention, at least two of the mobile nodes further include satellite communication capabilities, so as to incorporate satellite communications into the network in accordance with the multi-interface dynamic routing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system. Moreover, according to actual instrumentation and equipment of embodiments of the method and/or system of the invention, several selected tasks could be implemented by wireless communication transmission and/or reception hardware, software, firmware or a combination thereof, using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system.

In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a mobile ad-hoc network with dual-type backbone nodes, and, more particularly, but not exclusively, to a mobile ad-hoc network with backbone nodes having satellite communication capabilities.

MANET networks enable mobile nodes to communicate over a network with dynamically-changing topography, without requiring data routing via a fixed gateway. However current MANETs typically do not exceed a radius of a few kilometers, due to factors such as the limited transmission range of the mobile nodes and other topological constraints.

The embodiments herein provide an extended mobile ad-hoc network with multi-interface dynamic routing which utilizes multiple types of communication links. For example, by including mobile nodes with both wireless and satellite communication capabilities, network routing may dynamically and automatically make decisions to forward and/or receive information traffic between nodes within the ad-hoc network using both satellite communication and mobile wireless communication (typically short-range). Ad-hoc multi-interface dynamic routing, management and decision support information gathering capabilities are extended to encompass the multiple aspects of satellite communication integration into the ad-hoc network. An ad-hoc network enabling backbone routing via both mobile and satellite communication is denoted herein a MARSNET.

Some of the embodiments described herein relate to packet data transmission. It is to be understood the communication protocols are not limited to packet data transmission. Other communication protocols which enable a given node to forward incoming data traffic towards a destination node may be used.

Some of the embodiments described herein relate to a clustered network, where backbone nodes serve as cluster heads for respective clusters. It is to be understood that the invention is not limited to clustered networks. Un-clustered or partially-clustered network topographies may be utilized.

Network Structure

Figure 1:
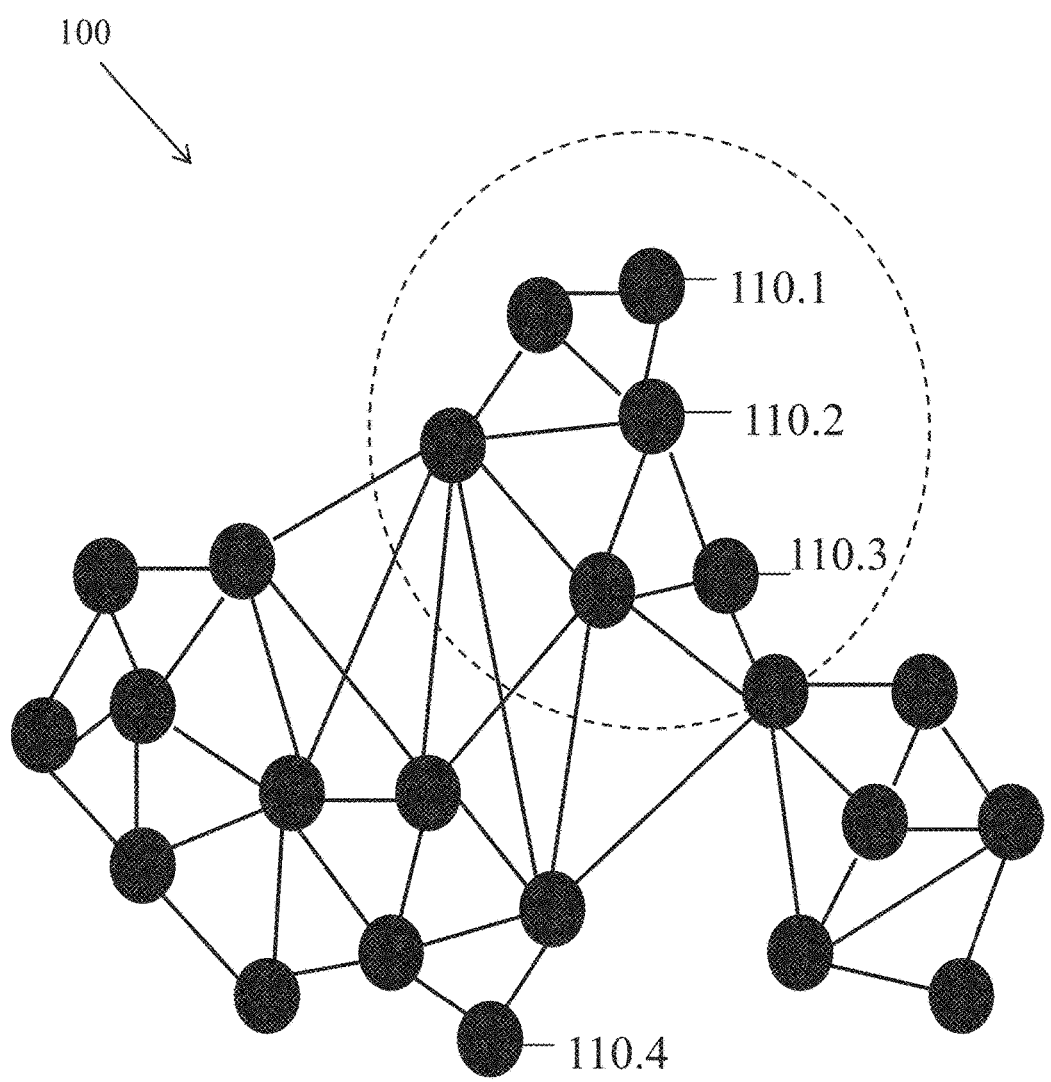
FIG. 1 is a simplified diagram of a prior-art unclustered mobile ad-hoc network.
Figure 2:
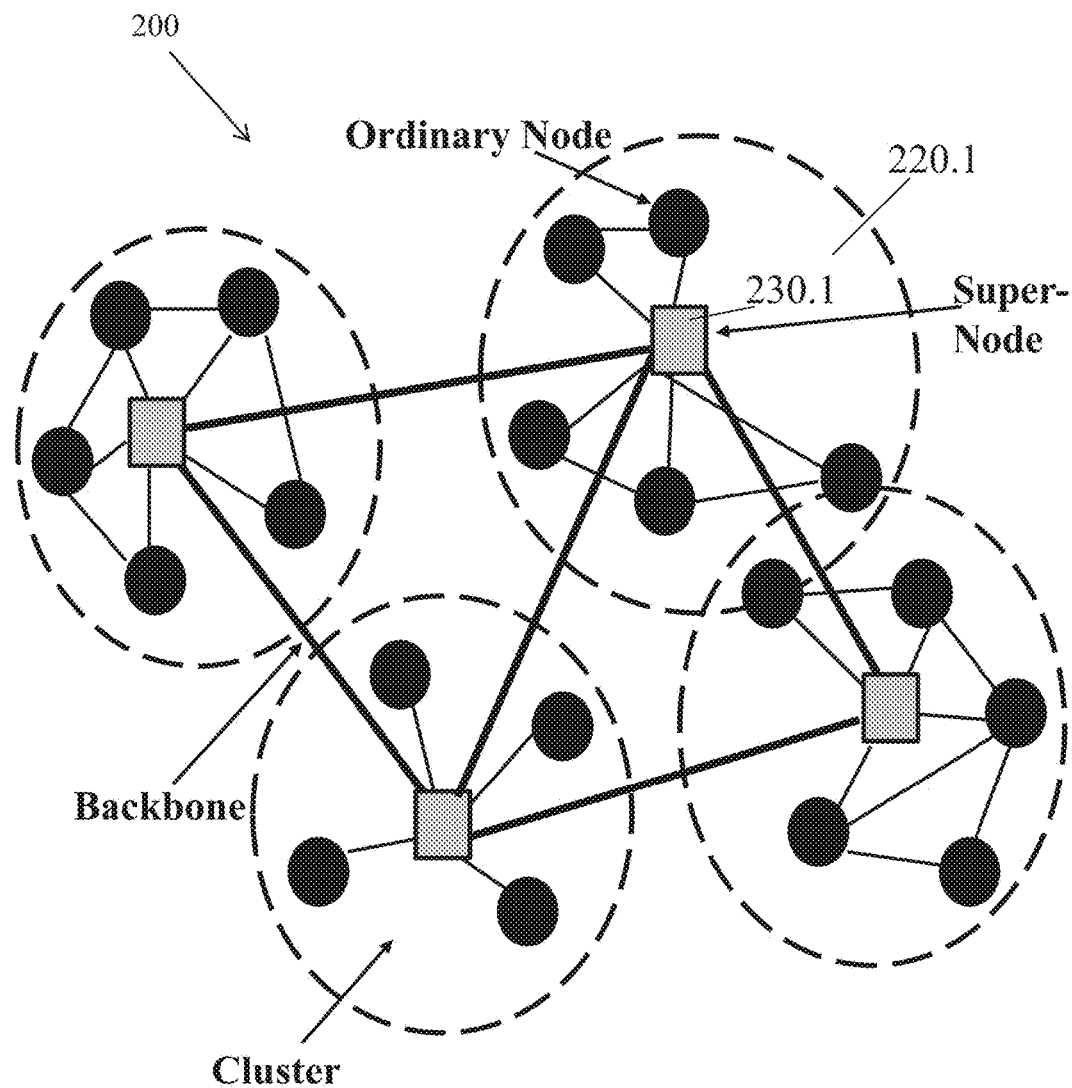
FIG. 2 is a simplified diagram of a prior-art clustered mobile ad-hoc network.
Figure 3A:
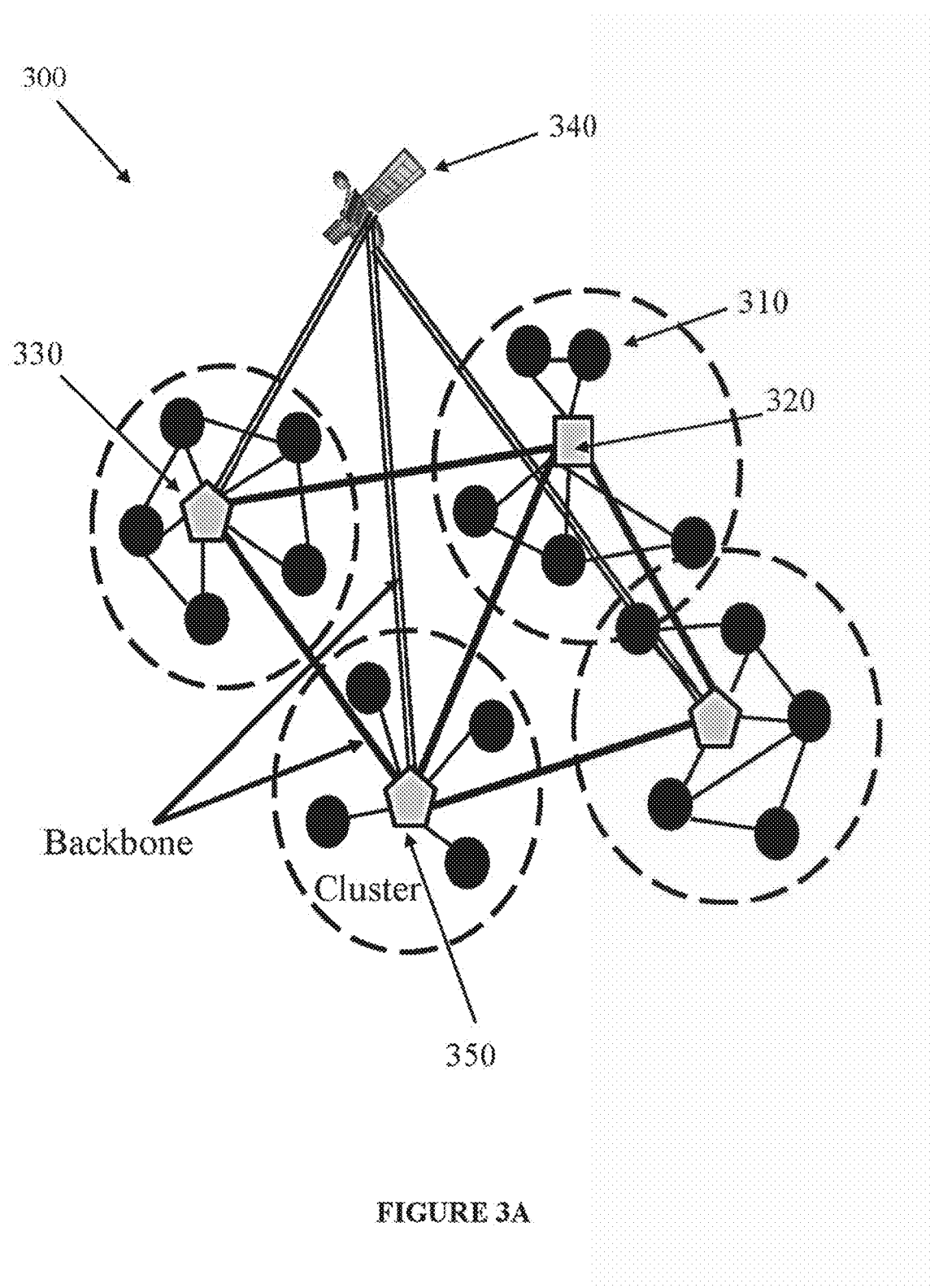
FIG. 3A is a simplified diagram of a mobile ad-hoc communications network with satellite portions of the backbone link, according to embodiments of the present invention.

Referring now to the drawings, FIG. 3A is a simplified diagram of a mobile ad-hoc communications network with a satellite portion of the backbone link, according to embodiments of the present invention. In the illustrated embodiment, MARSNET 300 is a clustered network which includes multiple mobile nodes (e.g. 310, 320, 330 and 350). The MARSNET 300 also includes at least one node with satellite link capabilities in addition to wireless communications 340 which transmits data between mobile nodes, as described in more detail below. Communication between the mobile nodes utilizes ad-hoc multi-interface dynamic routing. It is noted that other embodiments are possible for other network configurations (e.g. partially clustered or unclustered) which include a backbone link in addition to the direct communication between mobile nodes.

In the following a node within the MARSNET may also be denoted a MARSNET node. For example, the terms "mobile node" and "mobile MARSNET node" are to be considered equivalent.

As used herein, the terms "communicating" means that data is conveyed between network nodes through the MARSNET in accordance with the current routing.

As used herein, the terms "wireless communication" and "mobile wireless communication" mean the type of communication utilized by mobile units communicating with each other directly, for example radio communication.

As used herein, the term "dynamically" means that the operation (such as node status designation, information routing path decisions, information forwarding to other nodes in the network, etc. . . . ) is performed in real time and may be implemented within each node of the MARSNET.

As used herein, the term "ad-hoc" means MANET ad-hoc adapted for the MARSNET such that nodes make dynamic, real-time decisions for data transfer using multiple forms of wireless communications in accordance with current measured, and/or estimated and/or calculated parameters and network conditions (e.g. topology, load, traffic, delay, available/required bandwidth, link health, link throughput, topography, node types, active and inactive links, routing protocol, etc. . . . ).

As used herein, the terms "multi-interface dynamic routing", "dynamic routing", "network routing" and "routing" relate to data routing over multiple forms of wireless communication.

As used herein, the term "communication capabilities" means that the node may communicate over a corresponding type of communication link. For example the term "satellite communication capabilities" means that MARSNET nodes both having satellite communication capabilities may communicate with each other over a satellite communication link within the same network and without having to be re-routed to an external network outside the MARSNET.

As used herein, the term "one-hop" (and similar terms such as "one-hop node" or "one-hop neighbor") means a given node may communicate directly with a second node, without forwarding data through an intermediate node.

Some or all of the mobile nodes may be switched dynamically between operation as an ordinary node or as a backbone node. In order to utilize backbone routing techniques, multiple mobile nodes are, dynamically and temporarily, designated backbone nodes and the remaining nodes are designated ordinary nodes. The mobile backbone nodes form a routing backbone of the MARSNET over a dedicated backbone link.

As described below, in some embodiments the designation as ordinary or backbone node is performed by the node itself, in accordance with the current condition of the network. The node continually monitors network topology and identifies its own role. Changes in network topology and other factors which affect network routing may cause the node to identify a need to switch its designation from backbone node to ordinary node or vice versa. The node designation takes into account whether the node has satellite communication capabilities, the capabilities of neighboring ordinary and backbone nodes and other factors. Typically the change in designation is communicated to other nodes by MARSNET protocols.

When at least two satellite-capable nodes operate as backbone nodes a satellite portion may be incorporated into the backbone link.

The ad-hoc dynamic routing takes into consideration the extended capabilities provided by satellite communications between nodes. For example, certain data types may be routed between backbone nodes via the satellite portion of the backbone link while other data types are routed only via wireless/radio links between mobile backbones nodes. Ad-hoc routing enables nodes to utilize each of its wireless communication interfaces independently and simultaneously. Nodes may transport data payload, making decisions dynamically in real-time to choose what data payload to transmit over which interface based on which of the available interfaces is the most suitable interface to use for that specific data payload transport to the designated destination.

It is to be understood that routing data between nodes by satellite communication (and likewise terms) does not limit the data transmission between nodes to satellite communications alone. Other portions of the routing may be made by mobile wireless transmission and/or any other forms of communication available within the MARSNET.

In the exemplary embodiment of FIG. 3A, the current routing designates node 310 as an ordinary node, and nodes 320, 330 and 350 are designated backbone nodes. Satellite 340 forwards data between backbone nodes having satellite communication capabilities (e.g. backbone nodes 330 and 350) over the backbone link. In this way a satellite portion may be incorporated into the backbone link. If current routing does not include two satellite-capable backbone nodes there may temporarily be no satellite portion in the backbone link, until an updated routing enables reincorporation of a satellite portion.

Figure 3B:
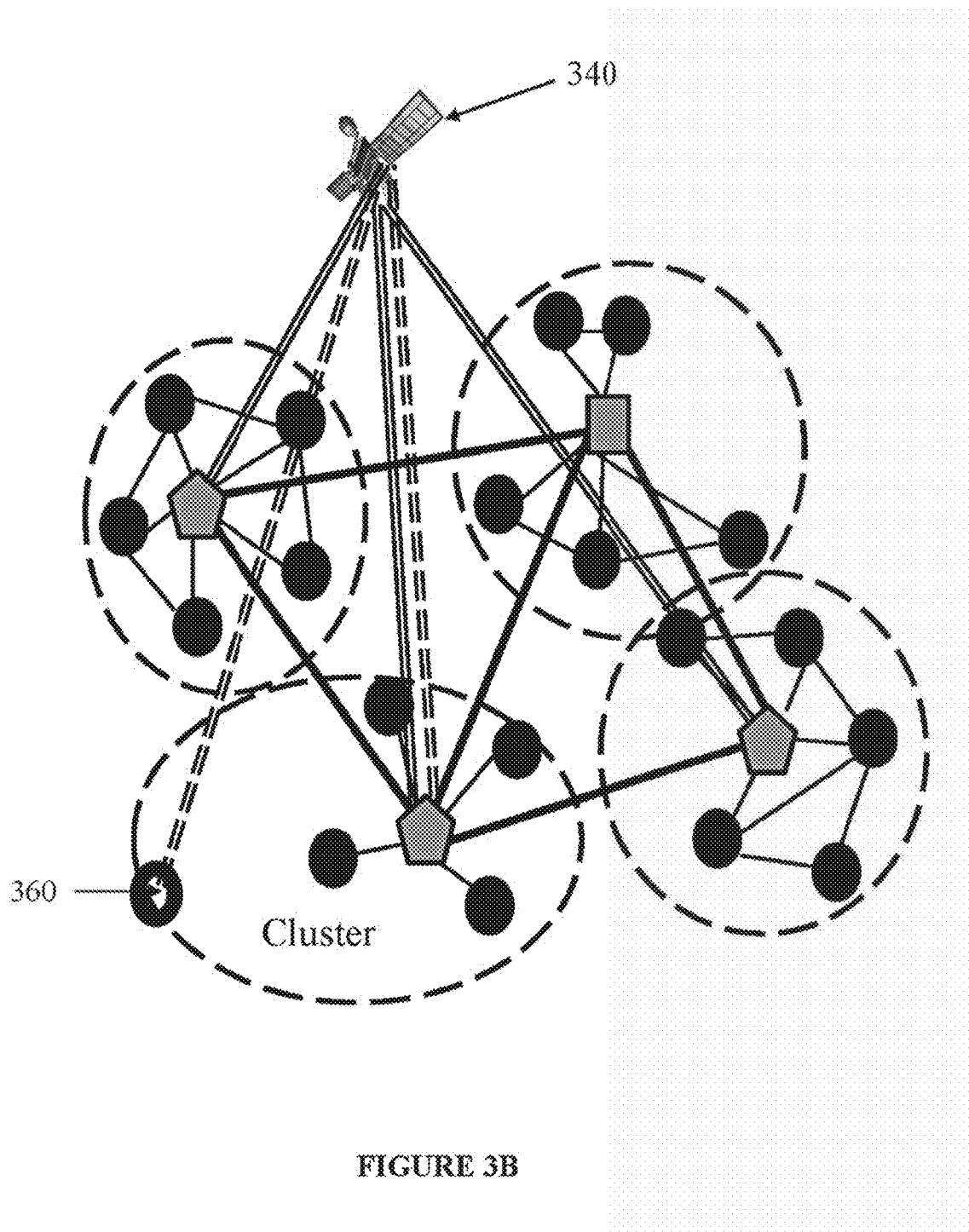
FIG. 3B is a simplified diagram of a mobile ad-hoc communications network which includes an ordinary node with satellite communication capabilities, according to embodiments of the present invention.

In some embodiments satellite 340 forwards data directly to ordinary nodes having satellite communication capabilities. FIG. 3B is a simplified diagram of a MARSNET having a similar topography to that of FIG. 3A, and further having ordinary node 360 with satellite communication capabilities. Ordinary node 360 may communicate directly via satellite 340 in accordance with the current routing protocol, without requiring data forwarding over the backbone link by an intermediate backbone node.

The inclusion of satellite communication in some or all of the MARSNET nodes, and specifically within the currently-designated backbone nodes, significantly extends the capabilities of the ad-hoc network. Satellite communications may operate over large distances and with higher data capacity than mobile nodes communicating solely by mobile wireless communication. Also, adding satellite communication capabilities (in addition to wireless/radio communications capabilities) in even a fraction of the mobile nodes in the network may result in significant benefits. These include:

i) Increase in the overall capacity, performance, reliability and resilience of the MARSNET; and ii) Enabling the MARSNET to better cope with temporary radio blockages and/or loss or heavy and rapid degradation of the radio/wireless link between mobile nodes. Such blockages, rapid degradation and/or loss of the radio/wireless link are typical to certain challenging terrains or locations where the mobile ad-hoc network may be deployed (for example densely built urban areas, jungle areas with dense foliage and tall trees, hilly or canyon rich areas and so forth).

In the following it is to be understood that the term "external network" may refer to a fixed external network or a mobile external network, unless explicitly specified as fixed or mobile.

In the following it is to be understood that the term "gateway node" may refer to a fixed node or a mobile node, unless explicitly specified as fixed or mobile.

In some embodiments the MARSNET includes one or more gateway nodes which operate similarly to mobile nodes (e.g. communicating with other nodes according to MARSNET multi-interface dynamic routing) and also serve as a gateway to an adjacent external fixed or mobile network. These gateway nodes are connected to a local external network as well as to the MARSNET backbone, enabling them to efficiently move data payload from the external network into MARSNET mobile nodes and vice-versa.

In some embodiments a fixed gateway node is used when the external network is fixed and/or a mobile gateway node is used when the external network is mobile.

Being part of the MARSNET, a gateway node may dynamically monitor and update parameters required for routing decisions related to the transport of data payload to mobile nodes in the MARSNET. These parameters may include one or more of: network topology, currently designated backbone nodes, etc. In some embodiments, a gateway node includes satellite communication capabilities, enabling the gateway node to communicate with other MARSNET backbone nodes as long as there is a satellite portion within the backbone link. A gateway node may function as a front-haul/back-haul gateway to fixed and/or other mobile external networks outside the MARSNET. The inclusion of a front-haul/back-haul gateway enables efficiently moving information from mobile nodes to eternal networks (and vice-versa) through the MARSNET backbone thus reducing the load of such information transfers in the MARSNET, especially in multi-cast transmissions.

In some embodiments, a fixed gateway node includes mobile node functionality as required for communicating with other MARSNET nodes in accordance with the dynamic routing.

Figure 3C:
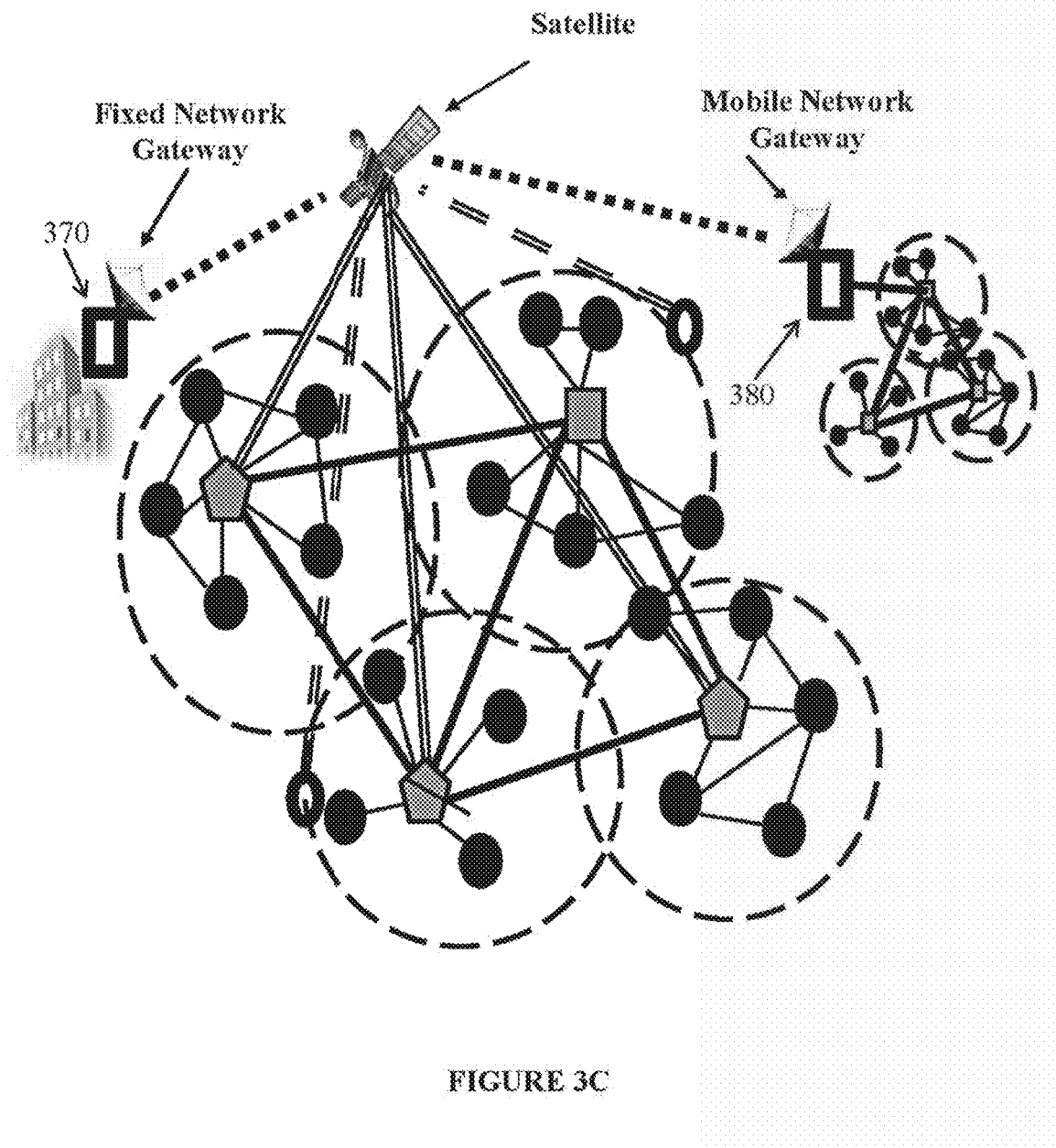
FIG. 3C is a simplified diagram of a mobile ad-hoc communications network with gateway nodes, according to embodiments of the present invention.

An embodiment is shown in FIG. 3C, which includes gateway nodes 370 and 380, serving as front-haul/back-haul gateways to a fixed external network and an external mobile network respectively.

As used herein, the term "back-haul gateway" means a gateway for delivering data from a MARSNET node to an external network.

As used herein, the term "front-haul gateway" means a gateway for delivering data from an external network to a MARSNET node.

As used herein, the terms "front/back-haul gateway node" and "front/back-haul gateway" means a node serving as a gateway for delivering data from a MARSNET node to an external network and/or vice-versa.

In some embodiments a satellite-capable backbone node serves as a front/back-haul gateway node for external fixed or mobile networks in order to forward information to nodes which are not equipped with satellite communication capabilities. This may reduce the number of hops required to disseminate information within the radio/wireless ad-hoc network. The availability of multiple front/back-haul gateway nodes with satellite communications within the MARSNET enables multicast transmissions originating from external or internal sources to be transmitted in parallel to multiple front/back-haul gateway nodes. These parallel transmissions may be further transmitted to neighboring mobile nodes (e.g. members of a specific multicast group), thus reducing the overall MARSNET traffic load and the number of hops required for data transmissions to reach all their destination nodes. In addition, front/back-haul gateway nodes with satellite communications within the MARSNET may enable any MARSNET mobile node to deliver information destined for external networks with minimal hops (e.g. one hop to the designated backbone-node, then via the backbone directly to the front/back-haul node to be forwarded to the external network. This minimizes the load within the MARSNET resulting from data transmissions destined to external fixed or mobile networks.

In some embodiments the satellite portion of the backbone link unites mobile nodes in split coverage areas into a single MARSNET network. This overcomes wireless blockages which result in a split coverage area. Such wireless blockages may be temporary, for example when groups of mobile nodes circumvent a hill or building from different sides and as a result lose line-of-sight required for mobile wireless communication. Mobile nodes temporarily located within disconnected coverage areas are thus able to maintain a connection within the MARSNET network. The MARSNET is thus capable of supporting challenging terrains (terrains such as hills, canyons, densely populated areas with tall building, jungles with tall trees etc.), which may lead to complex MARSNET network topologies which include temporarily isolated coverage areas.

Figure 4A:
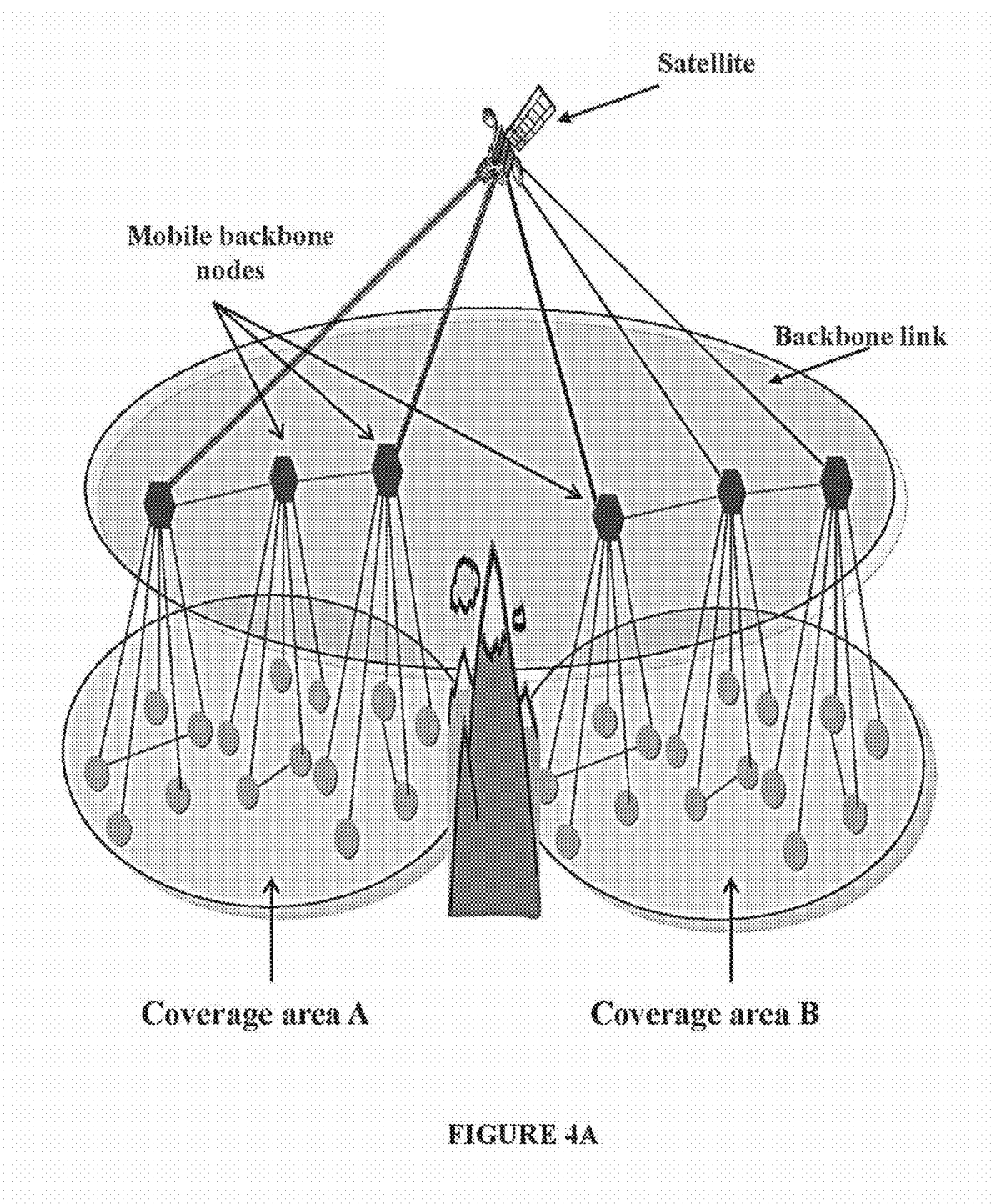
FIGS. 4A and 4B are simplified diagrams of mobile ad-hoc communications networks utilizing satellite-capable backbone nodes to connect between split coverage areas, according to respective embodiments of the present invention.
Figure 4B:
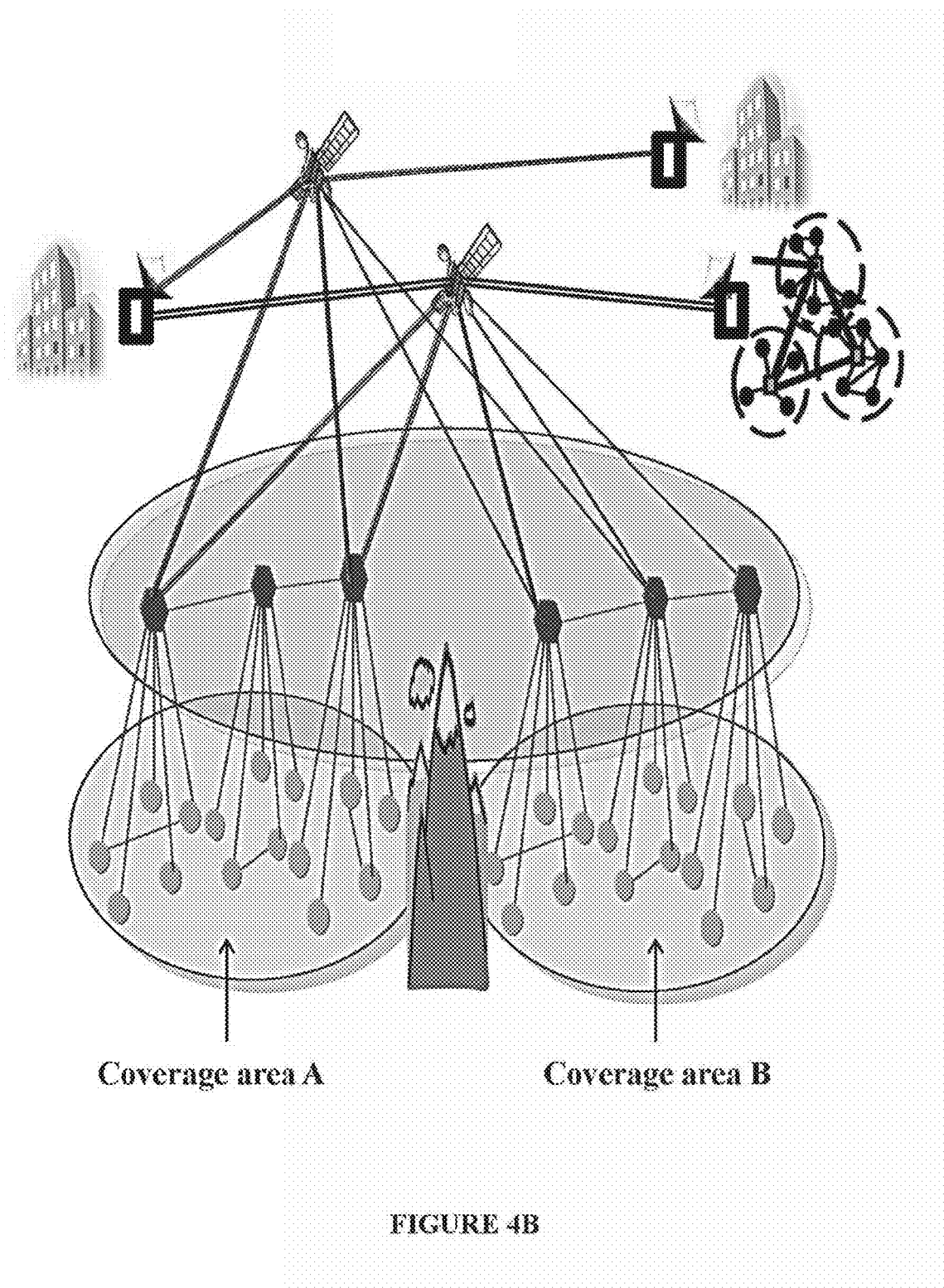

FIGS. 4A and 4B illustrate respective embodiments of extended ad-hoc networks in which satellite-capable backbone nodes communicate over a satellite portion of the backbone link in order to connect between split coverage areas. Data may be transferred between all MARSNET nodes (possibly across complex topologies including MARSNET nodes temporarily located in several split coverage areas) using the existing routing protocol, even if the originating and destination nodes are in separate isolated coverage areas. Data transfer may be performed completely within the MARSNET, without the need for rerouting information through external networks.

FIG. 4A illustrates a MARSNET with split coverage areas connected by a single satellite. FIG. 4B illustrates a MARSNET with split coverage areas, connected over two satellite communication links. The MARSNET of FIG. 4B also includes three gateway nodes which serve as gateways to external networks.

Node Types

The expansion of mobile ad-hoc networks to support satellite communication receive and transmit capabilities, and the addition of such capabilities to ad-hoc network nodes results in multiple types of nodes that may take part in the MARSNET. Mobile node types may include:

1) Mobile backbone node with wireless communication;
2) Mobile backbone node with wireless communication plus satellite receive capabilities;
3) Mobile backbone node with wireless communication plus satellite transmit capabilities;
4) Mobile backbone node with wireless communication plus satellite transmit and receive capabilities;
5) Mobile ordinary node with wireless communication capabilities;
6) Mobile ordinary node with wireless communication plus satellite receive capabilities;
7) Mobile ordinary node with wireless communication plus satellite transmit capabilities;
8) Mobile ordinary node with wireless communication plus satellite transmit and receive; and
9) Gateway node (mobile or fixed) with wireless and/or satellite communication capabilities. The gateway node may also include further communication capabilities enabling it to route traffic to and from one or more external networks, and thus serve as a gateway between the MARSNET and the external network.

Note that since MARSNET nodes are typically mobile and topology changes based on the terrain and on the location of the MARSNET nodes, the designation of a given node as backbone or ordinary may change over time, in accordance with current network topology. The specific types and numbers of nodes in the MARSNET and the network topology dictated by their position relative to other MARSNET nodes varies dynamically, due to factors such as: nodes moving in different directions, temporary and/or permanent node disconnection, radio blockages and interferences, rain and weather conditions, terrain and temporary obstacles passed by the mobile MARSNET nodes and other factors.

Satellite-Capable Mobile Nodes

Figure 5:
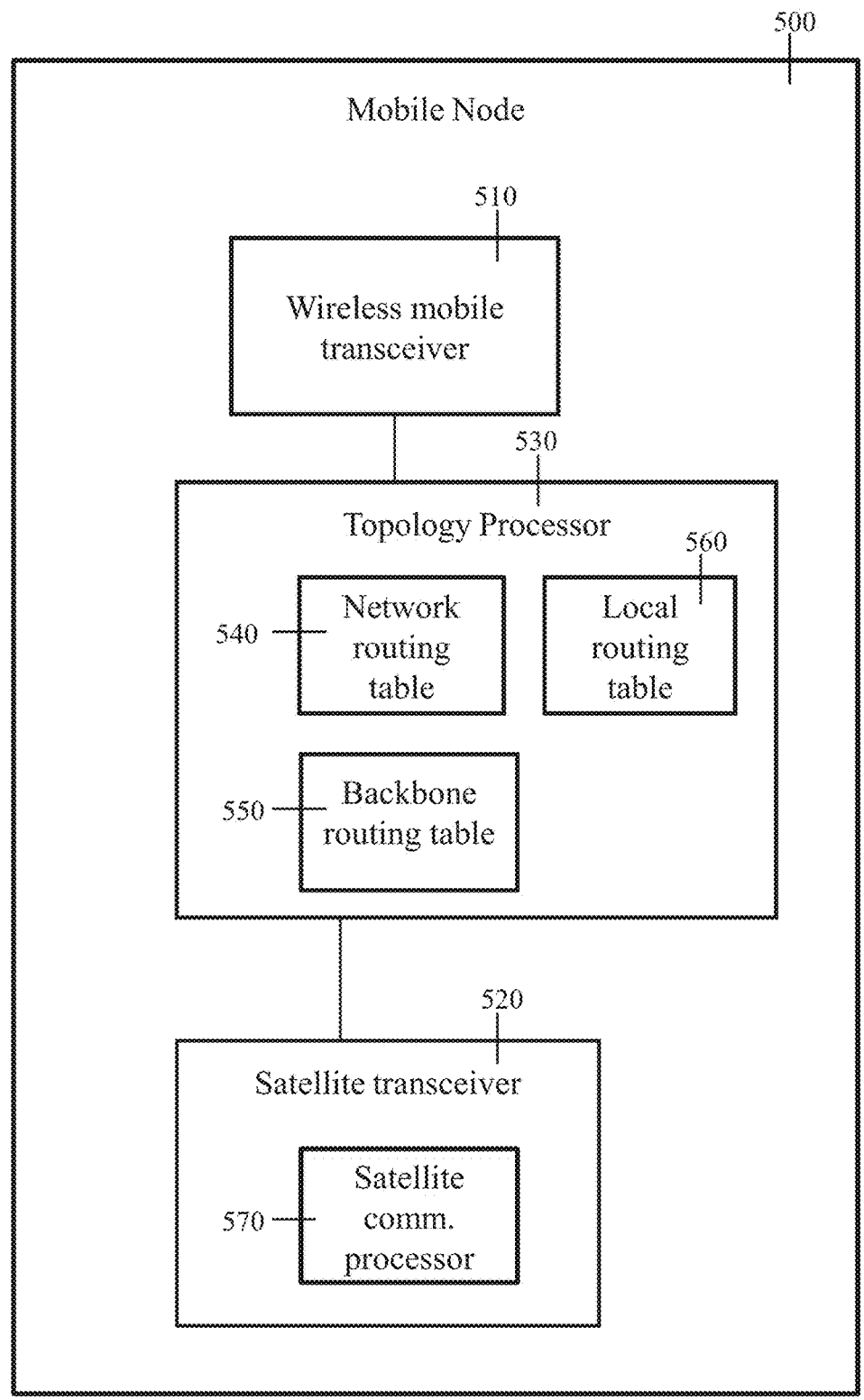
FIG. 5 is a simplified block diagram of a mobile node with satellite communication capabilities, in accordance with embodiments of the present invention.

Reference is now made to FIG. 5, which is a simplified block diagram of a mobile node with satellite communication capabilities, in accordance with embodiments of the present invention. Mobile node 500 has both mobile wireless and satellite communication capabilities.

Mobile node 500 includes:

i) Wireless transceiver 510 serves for direct communication between mobile nodes. When operating as a backbone node, wireless transceiver 510 may also serve for direct communication between other mobile backbone nodes over the wireless backbone link. (In some embodiments a wireless transceiver is present in all MARSNET nodes, even those without satellite communication capabilities.)

ii) Satellite transceiver 520 facilitates satellite communication between nodes equipped with satellite communication capabilities (in addition to their wireless communication capabilities). When operating as a backbone node, satellite transceiver 520 facilitates communication with other nodes over the satellite portion of the backbone link. In some embodiments satellite transceiver 520 is capable of communicating over multiple satellite links. In some embodiments satellite transceiver 520 is used for communication between ordinary mobile nodes, each equipped with a satellite transceiver.

iii) Topology processor 530 provides network topology and routing functionality (as described below). Topology processor 530 may decide when to switch mobile node 500 between operation as an ordinary node and as a backbone node.

Since mobile node 500 may operate as either an ordinary node or as a backbone node, topology processor 530 keeps track of the dynamically changing topology of the network and the backbone and ordinary node positions within the MARSNET. Topology processor 530 may maintain several routing protocols such as: network routing table 540 which maintains a routing table over the entire MARSNET, backbone routing table 550 which maintains a routing table between currently designated backbone nodes over the backbone link, and local routing table 560 which maintains a routing table between a localized group of nodes which communicate directly or with their designated backbone node without utilizing the backbone link (e.g. clustered nodes).

In some embodiments, satellite transceiver 520 operates as a receiver (without transmission capabilities) or, alternately, as a transmitter (without reception capabilities).

In some embodiments, wireless transceiver 510 operates as a receiver (without transmission capabilities) or, alternately, as a transmitter (without reception capabilities).

Reference is now made to FIGS. 6A-6F which are simplified block diagrams of respective embodiments of the present invention. Each of the MARSNET nodes of FIGS. 6A-6F includes: radio/wireless transmitter 650, radio/wireless receiver 640, local topology processor 620, network topology processor 610, and backbone and a multicast processor 630. In addition to the above components, some of the nodes may include additional components as described below. All the differently configured nodes may coexist and form part of the same MARSNET. Other types of nodes may also be included in the MARSNET.

The transmitting and receiving components transmit and receive data over wireless and/or satellite media. This data may be in any suitable format, such as data packets and/or messages.

Local topology processor 620 operates in coordination with radio/wireless transmitter 650 and radio/wireless receiver 640. When the node includes satellite communication capabilities, local topology processor 620 further operates in coordination with the satellite communication components (i.e. satellite communication transmitter 670 and/or satellite communication receiver 660 and satellite communication processor 680). Local topology processor 620 maintains a local topology database, and dynamically determines the role of the node. When satellite communication capabilities are available, local topology processor 620 maintains the information required to differentiate the between radio/wireless and satellite communication capabilities (such as delay, bandwidth, traffic load and others).

Network topology processor 610 dynamically maintains the routing information which defines the current network topology, facilitating the proper functioning of node 600, when operating as a backbone node and when operating as an ordinary node. When node 600 is designated a backbone node, network topology processor 610 maintains a network topology database, and establishes and terminates a dedicated backbone routing link with one-hop backbone node neighbors as well as the one-hop ordinary nodes (possibly clustered) for which node 600 is currently designated as the backbone node. When satellite communication capabilities exist within the backbone node, network topology processor 610 maintains additional information regarding all the current backbone nodes with satellite communication capabilities. This additional information may include: gateway information to remote external networks connected via satellite, temporary or permanent blockages of wireless communication between certain backbone nodes and other relevant information.

Backbone and multicast processor 630 operates actively when node is designated with the role of backbone node. Backbone multicast processor 630 maintains a backbone multicast registration table and may further perform one or more of:

i) Maintaining gateway information to external networks connected via satellite;
ii) Transmitting backbone multicast update messages; and
iii) Forwarding multicast packets.

Backbone and multicast processor 630 may include a local multicast processor which operates when the node is designated with the role of backbone node. Local multicast processor maintains a local multicast registration table, and transmits local multicast update messages to each one-hop ordinary node neighbor. When a backbone node includes satellite receive capabilities, the backbone node may receive multicast transmissions over satellite for all the one-hop ordinary nodes registered in the local multicast registration table, and forward the multicast messages over radio/wireless communication.

When the node is designated an ordinary node, the local multicast processor transmits a multicast group subscription message to a selected one-hop backbone node neighbor. The local multicast processor also forwards a multicast packet to a one-hop backbone node neighbor, where the one-hop backbone node neighbor serves one of the multicast groups associated with the multicast packet. Each of the nodes attempts to communicate with a minimal number of one-hop backbone node neighbors. When an ordinary node is equipped with satellite receive capabilities, it may receive multicast transmissions directly from gateways connected via satellite.

Multicast transmissions may originate from an external network and be forwarded into the MARSNET by a front/back-haul node, for further distribution through the backbone nodes to the destination group of nodes within the MARSNET. Multicast transmission may also originate from nodes within the MARSNET, and the destination may include groups of nodes within the MARSNET and/or destinations within external networks. When destined for external networks, backbone nodes may transport the traffic to the front/back haul gateways for further re-routing to destinations outside the MARSNET.

Backbone and multicast processor 630 also includes backbone routing functionality, which dynamically determines what is the best path for forwarding information and whether communication should radio/wireless or satellite, based on the parameters dynamically and continuously collected from the ad-hoc network.

Figure 6A:
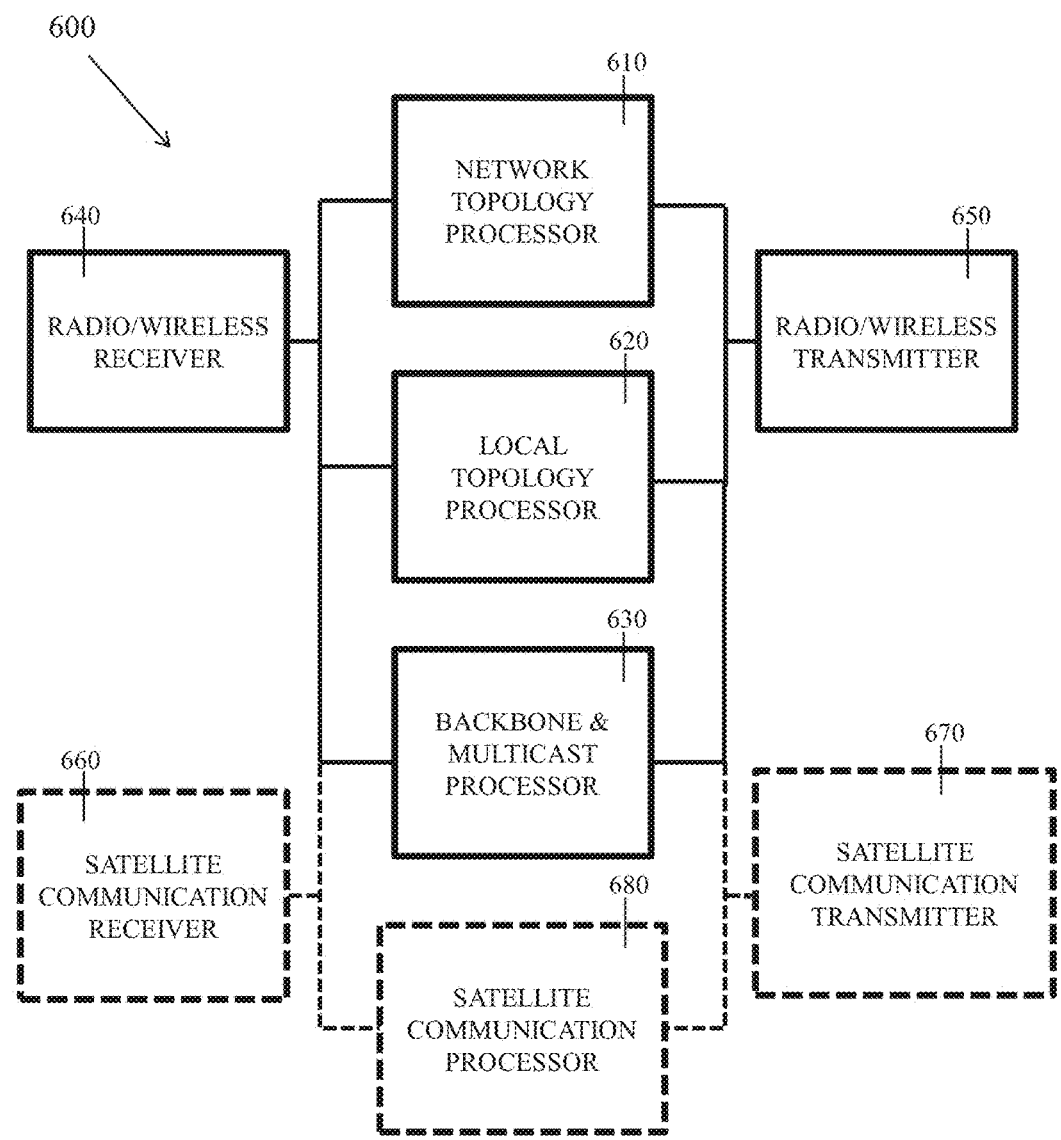
FIGS. 6A-6F are simplified block diagrams of MARS-NET nodes, in accordance with respective embodiments of the present invention.

FIG. 6A illustrates a mobile node having satellite communication capabilities. The mobile node additionally includes satellite communication receiver 660 and/or satellite communication transmitter 670. Satellite communications processor 680 processes incoming and outgoing satellite signals as required.

Figure 6B:
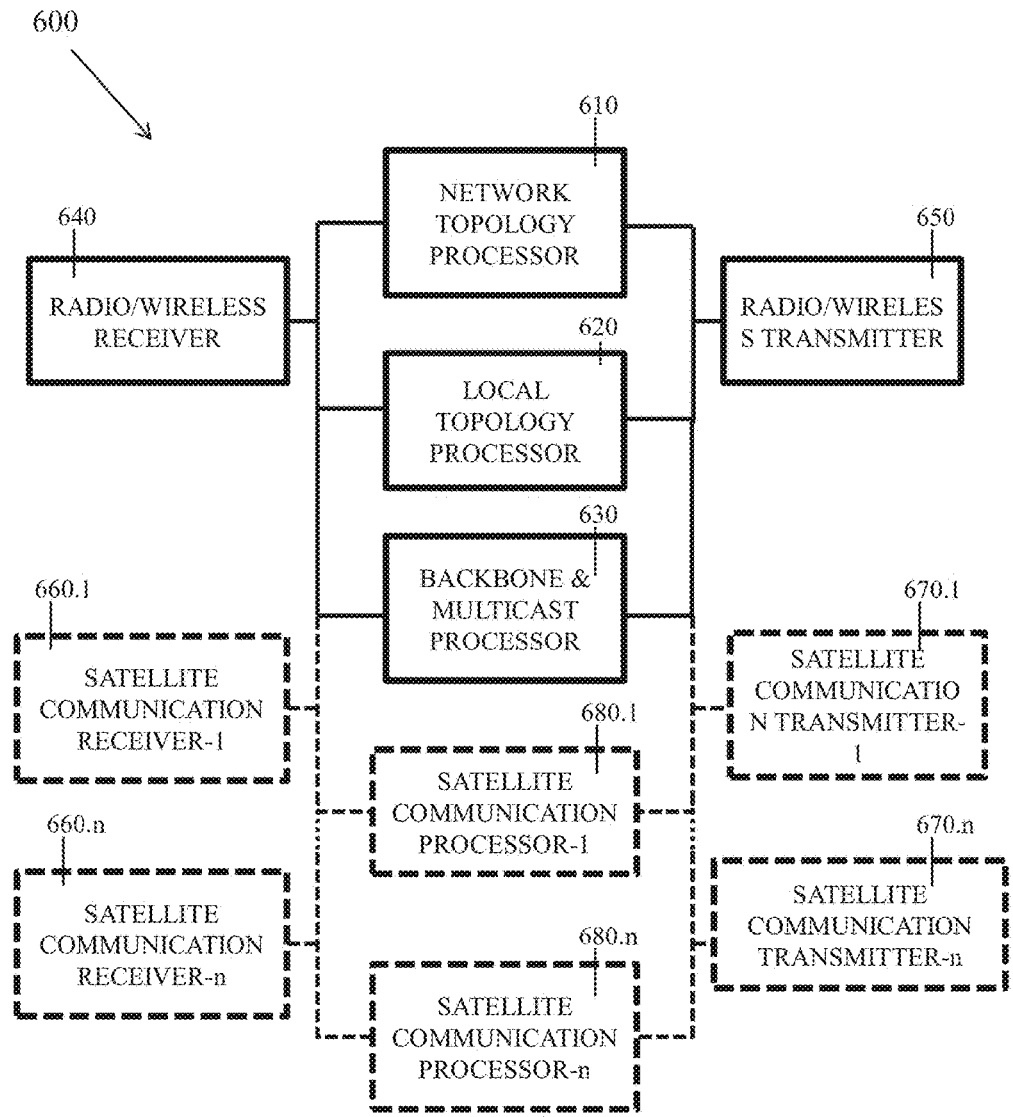

FIG. 6B illustrates a mobile node capable of communicating over multiple satellite links. The mobile node additionally includes satellite communication receivers 660.1 to 660.n and/or satellite communication transmitters 670.1 to 670.n. Satellite communications processors 680.1 to 680.n process respective incoming and outgoing satellite signals as required.

Figure 6C:
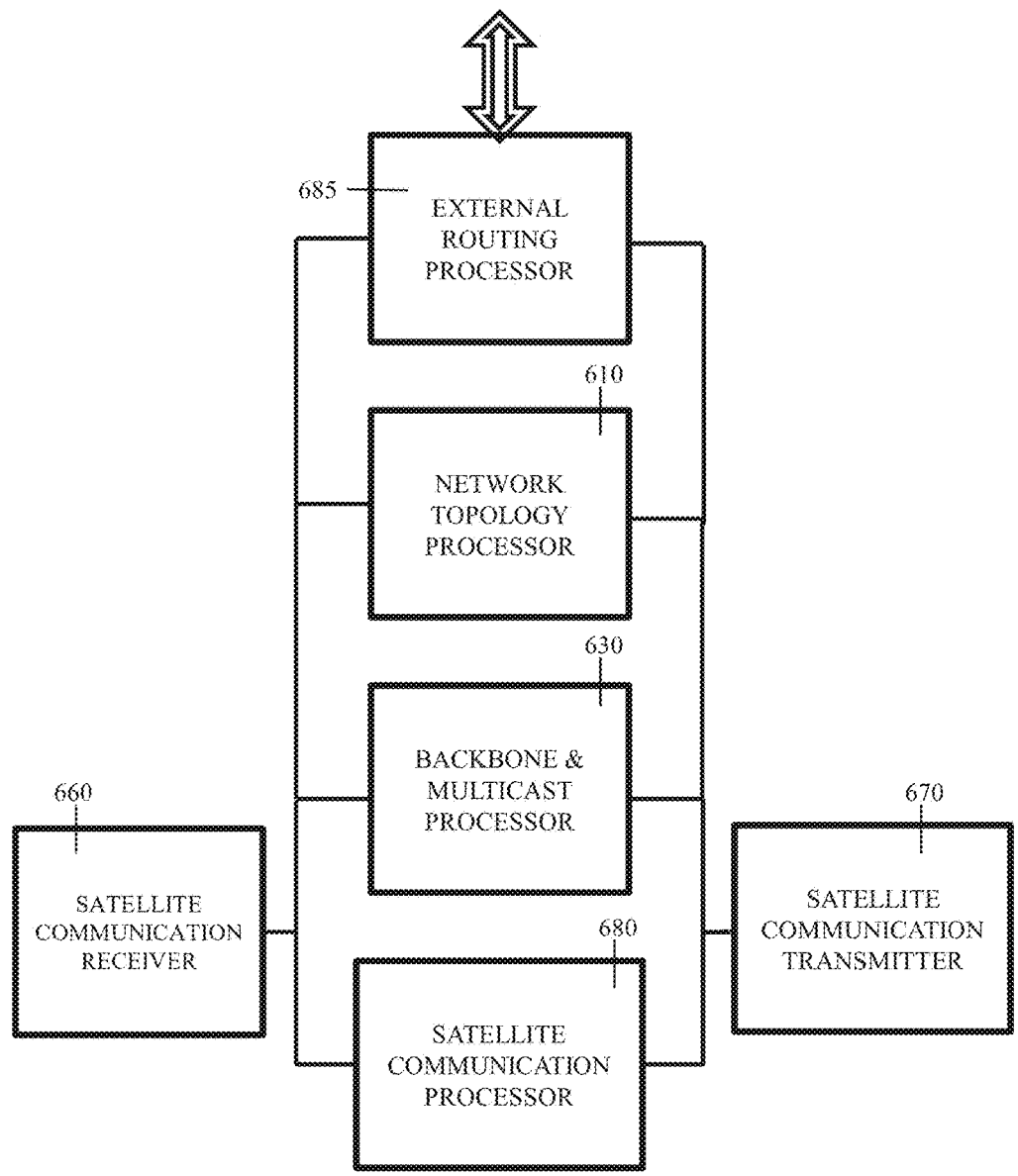

FIG. 6C illustrates a mobile node having satellite communication capabilities as in FIG. 6A, and further including external routing processor 685. The exemplary node illustrated in FIG. 6C may be a fixed node located adjacent to an external network and communicating with backbone nodes with satellite communication capabilities. The node illustrated in FIG. 6C is thus capable of operating as a Front-Haul/Back-Haul Gateway to an external (fixed or mobile) network.

Figure 6D:
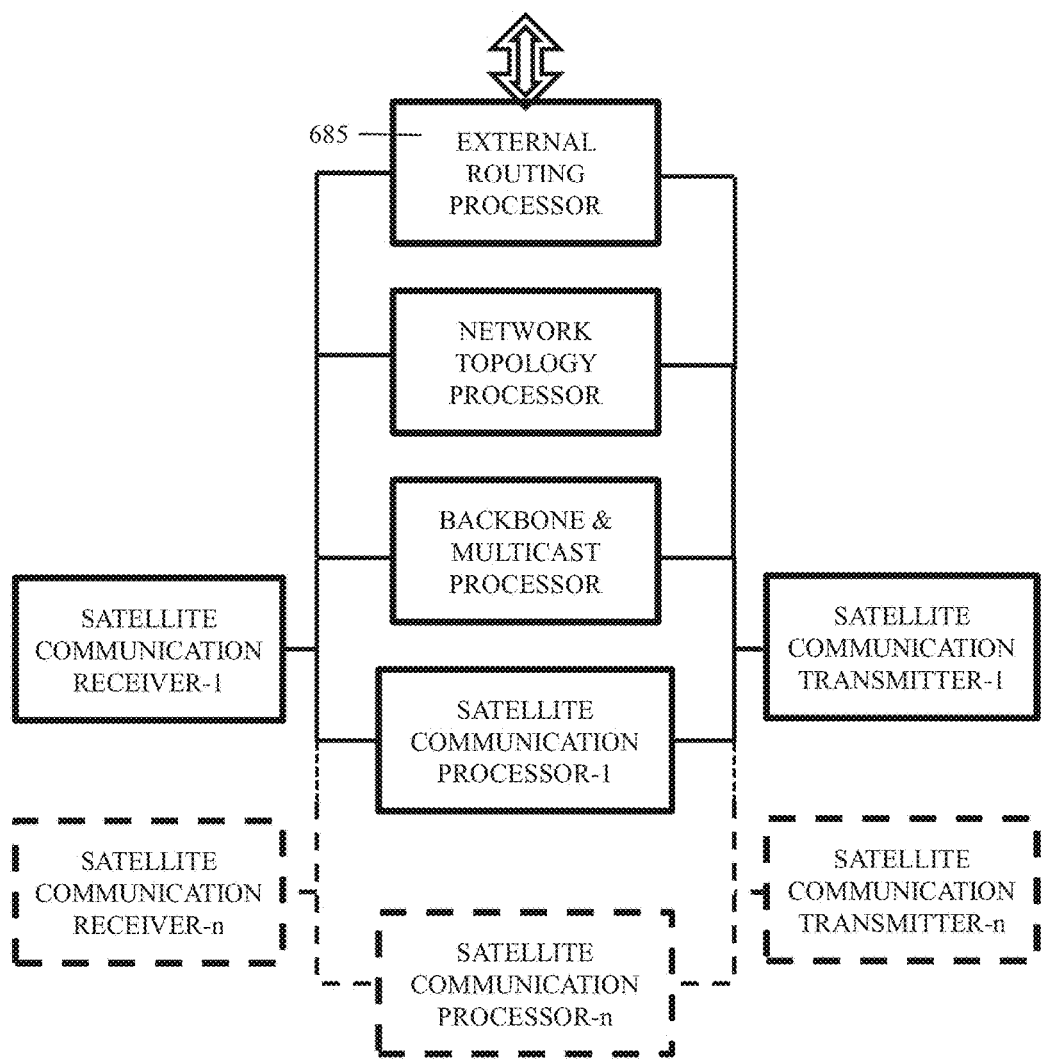

FIG. 6D illustrates a gateway node similar to the node of FIG. 6C, which is capable of communicating over multiple satellite links. The node includes external routing processor 685 enabling operation as a Front-Haul/Back-Haul Gateway.

Figure 6E:
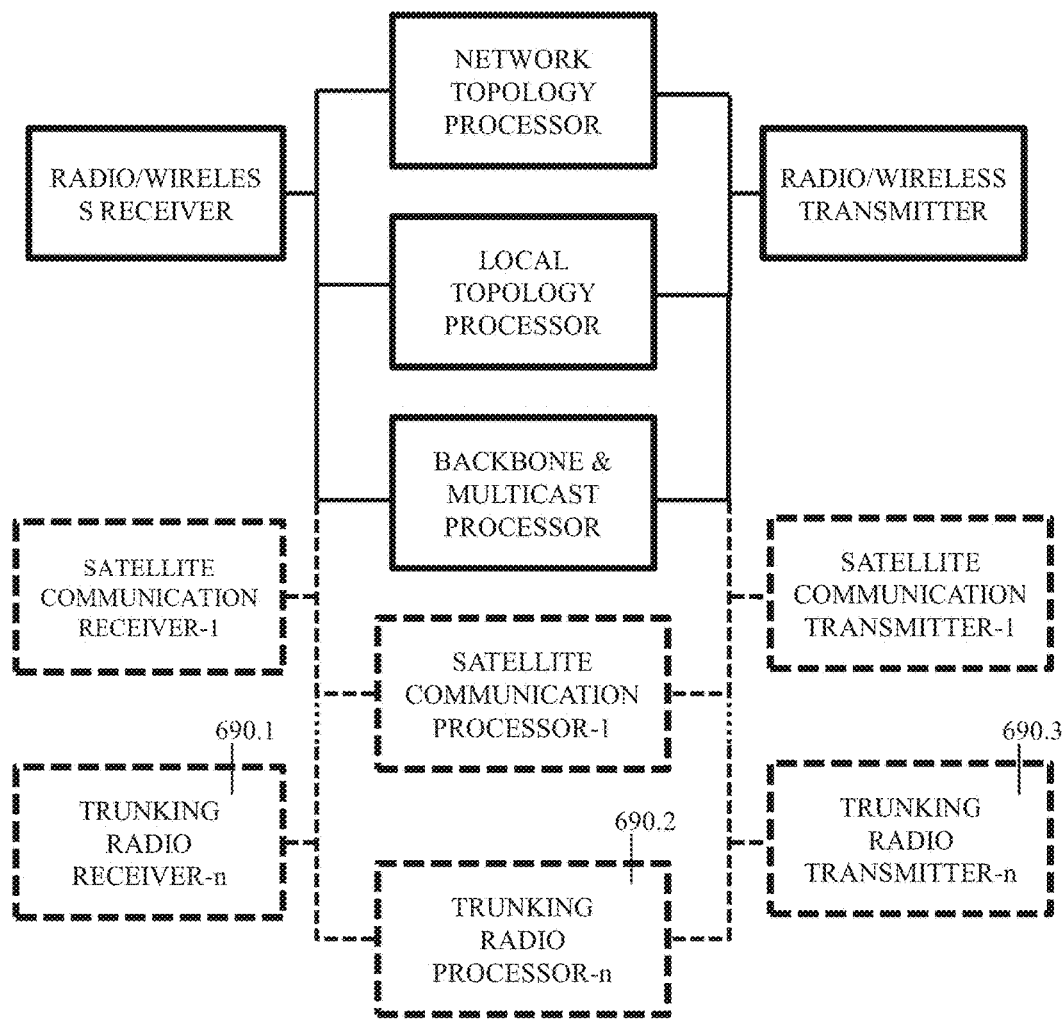

FIG. 6E illustrates a mobile node with satellite link support, and further including trunking radio receiver 690.1 and/or trunking radio receiver 690.3, and trunking radio processor 690.3. Both satellite and trunking radio communication may be over a single link or multiple links. The addition of trunking radio adds a third form of wireless communication to the MARSNET.

In some embodiments, MARSNET node is equipped with multiple satellite and/or multiple trunking interfaces, in addition to the wireless communication interface common to all MARSNET nodes. Each such additional interface extends the capabilities of the node, which may exploit the added capabilities to improve factors such as efficiency, performance, reach, resilience, reliability and others. The node may choose dynamically which interface(s) to use according to the current requirements and MARSNET network topology and conditions.

Figure 6F:
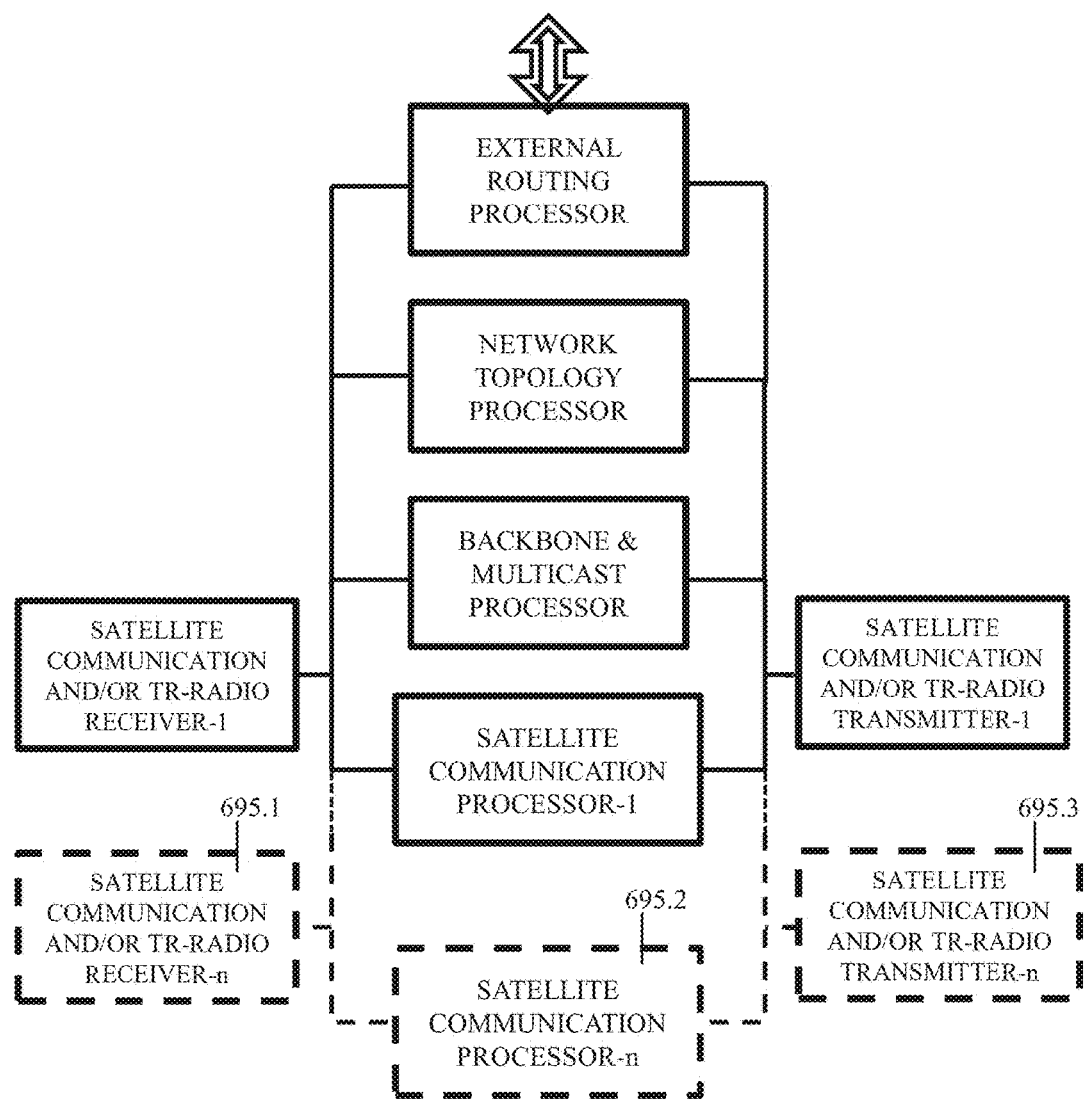

FIG. 6F illustrates a gateway node similar to the node of FIG. 6C with the addition of trunk radio communication capabilities. Both satellite and trunking radio communication may be over a single link or multiple links.

Additional Node Functionality

In some embodiments, backbone nodes also dynamically function as cluster-heads for other ordinary nodes. In such embodiments, when a node switches from an ordinary to a backbone node it assumes function as a cluster head to some or all of its one-hop ordinary node neighbors.

In some embodiments ordinary nodes with satellite communication capabilities may use SATCOM to communicate with their designated backbone cluster-head when mobile wireless communication is out of reach. MARSNET nodes may use both wireless and SATCOM simultaneously and/or may switch dynamically between SATCOM and wireless communication based on the current conditions in the MARSNET.

In some embodiments, mobile nodes in the MARSNET form one or more multicast groups. By utilizing MARSNET front/back-haul gateways, multicast groups may encompass multicase sources and destination located within external networks.

When the network is clustered, backbone nodes with satellite communication receive capabilities may receive information destined for the single-hop ordinary nodes clustered under the backbone node. The backbone node transfers this information to the destination ordinary node via mobile wireless communication. Similarly, backbone nodes equipped with satellite communication transmit capabilities may receive information originating from single-hop ordinary nodes clustered under the backbone node. The backbone node transfers this information to the destination nodes in the ad-hoc networks over the network backbone by radio/wireless communication and/or satellite communication.

In some embodiments, backbone node functionality and processing capabilities (such as monitoring and updating a MARSNET topology database) may be implemented on board the satellite, thus effectively forming a satellite node which may operate as a backbone node within the satellite portion of said backbone link and possibly reducing double-hop delays.

Multi-Interface Network Routing

Mobile ad-hoc network routing is based on many considerations, which may include: network and network load information gathering capabilities, clustering, automating assignment of different roles between ad-hoc network nodes to differentiate between ordinary nodes and backbone nodes, and the ability to implement gateway, clustering and multicast routing in mobile radio/wireless ad-hoc networks.

The following describes embodiments of MARSNET routing protocols. Other routing protocols may be used.

In the embodiments, the MARSNET performs all necessary activities required to seamlessly incorporate receive and transmit satellite communications. MARSNET nodes may collect data such as: relevant network topology, performance, payload nature, efficiency and behavior amongst the various MARSNET communication interfaces (e.g. mobile wireless and satellite), and may include decision logic to make dynamic decisions when to utilize each type of communication interface (separately or simultaneously) and what data to transmit over each communication interface. The decisions may be made in accordance with quality of service settings, performance and/or efficiency consideration.

MARSNET routing mechanisms and methods may include additional satellite communications information as required in order to make ad-hoc routing decisions. Routing protocols may dynamically determine when to forward certain data traffic between the nodes via the mobile wireless communications and/or via satellite communications. Transmission via satellite communication may achieve overall efficiency improvements, reliability and resilience improvements in network behavior, traffic load balancing, extend the boundary range of the ad-hoc networks, handle temporary blockages or interference affecting the ability to transmit over mobile wireless or when due to topographical impediments that may occur during the movement of ad-hoc nodes.

For example when the mobile nodes are split into split-coverage "islands", communication between these islands may be achieved using satellite communications. Network topologies may occur dynamically and automatically within the MARSNET without the need for data payload to be rerouted through external networks. MARSNET mobile wireless network topology may seamlessly adapt to the reigning conditions in the network, to better cope with challenging terrain, weather conditions, obstacles and interference.

In another example, traffic priority and/or bandwidth requirements may make it more efficient to use satellite communications within the MARSNET.

Ad-hoc routing mechanisms may also be extended to be able to simultaneously process and forward traffic received from both satellite communications and the mobile wireless communications. The MARSNET may simultaneously utilize both mediums to process, deliver and forward information to and from the MARSNET nodes in the most efficient manner, substantially increasing the overall capabilities, functionality, performance and throughput of the network. Routing mechanisms may enable the incorporation of various types of nodes dynamically into the network. The communication capabilities of each node may be recognized automatically and dynamically, and the node capabilities utilized to achieve the best and most efficient ad-hoc network functionality. Routing mechanisms may thus utilize all available communication capabilities of each node, so that nodes with radio/wireless communication capabilities only, nodes with mobile wireless and satellite receive-only capabilities and nodes with mobile wireless and receive/transmit satellite communication capabilities may all automatically and dynamically become part of the same ad-hoc network, and their capabilities be fully utilized by the routing mechanisms.

In some embodiments, nodes equipped with satellite reception capabilities act as a front-haul gateway node for external fixed or mobile networks to deliver information intended for nodes which are not equipped with satellite communication capabilities, thus reducing the number of hops required to disseminate information within the mobile wireless ad-hoc network. The availability of multiple front-haul gateway nodes with satellite communications enables multicast transmissions originating from external or internal sources to be transmitted in parallel to multiple front-haul gateway nodes, for further transmission to neighboring nodes members of a specific multicast group. This reduces the overall traffic load and number of hops required for multicast transmissions to reach all their destination nodes.

In additional or alternate embodiments, nodes equipped with satellite reception capabilities act as back-haul gateways transmitting traffic intended to external networks from neighboring nodes not equipped with satellite communications capabilities. The availability of multiple satellite communication enabled back-haul gateways within the ad-hoc network may shorten the number of hops and load required to deliver information from multiple nodes within the ad-hoc network to external networks.

In order to further improve MARSNET interfacing with remote external networks, optional remote satellite communication front-haul and back-haul gateway agents may be collocated within the MARSNET. These agents may include a modified version of the MARSNET routing mechanism adapted to deliver this remote satellite communication front-haul and back-haul gateway agent functionality for remote networks that require connectivity with MARSNET. This functionality may include automatic and dynamic recognition of one or several remote ad-hoc networks, the exchange of routing information required for such front-haul and back-haul gateways to be able to know when traffic is destined for nodes within multiple remote ad-hoc networks simultaneously, and other functions.

MARSNET Node Operation

Due to the dynamic operation of the MARSNET, all nodes continuously monitor network topology, and perform other required tasks which may include: identifying active and inactive links within the network, identifying one-hop neighbors, etc. . . . . The node determines its own status (as ordinary or backbone node), notifies other nodes of its current designation and establishes and maintains connections with one-hop neighbors, as required by current network topology.

Figure 7:
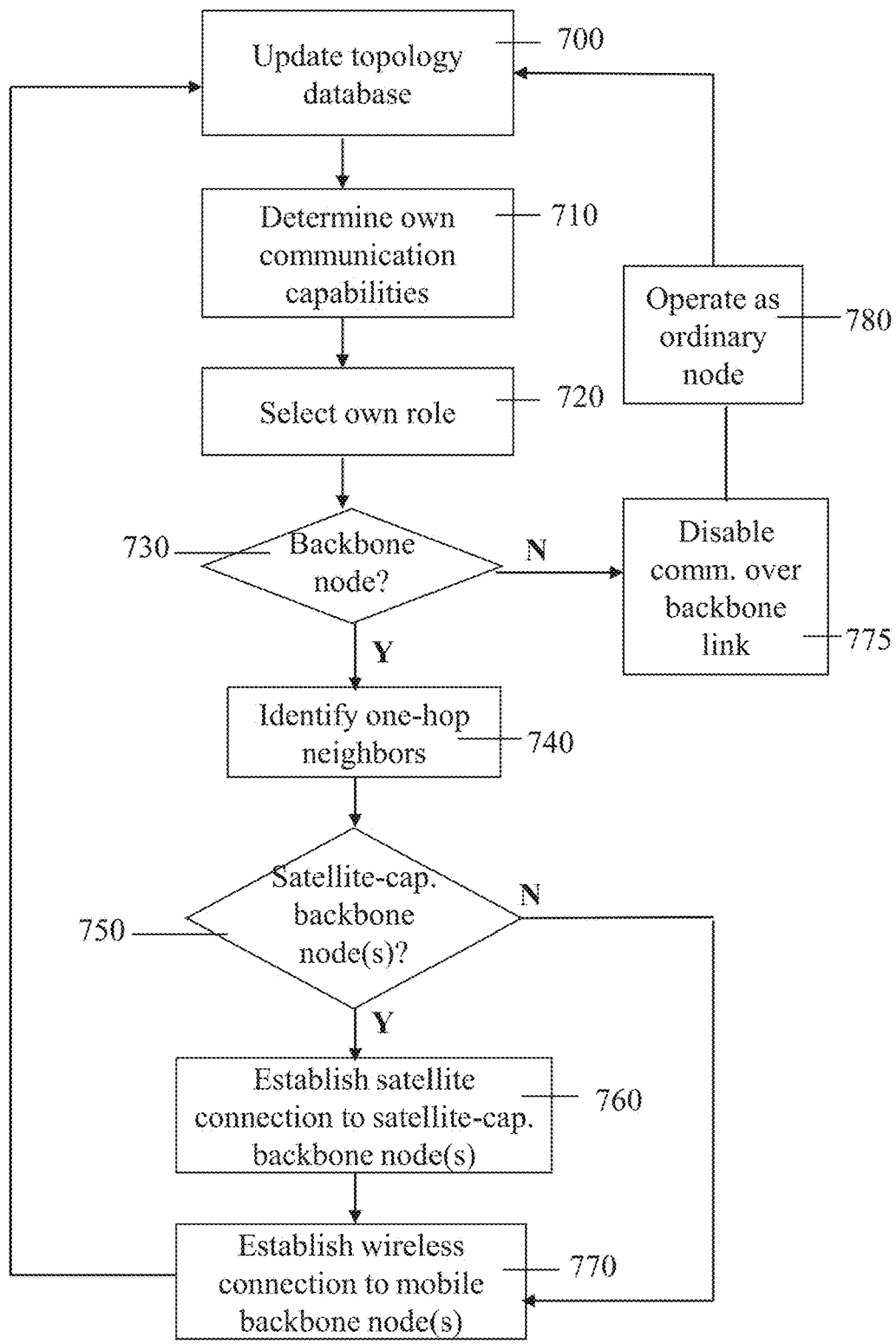
FIG. 7 is a simplified flowchart of a method of node operation in accordance with embodiments of the present invention.

Reference is now made to FIG. 7, which is a simplified flowchart of a method of node operation in accordance with embodiments of the present invention.

In 700 the mobile node updates the topology database. The updating may be performed periodically and/or upon receiving a cue (such as a multicast message). The topology updating may include network topology, local topology and/or backbone topology.

In 710 the mobile node determines its own communication capabilities, such as wireless transmit, wireless receive, satellite transmit and satellite receive. Typically the node communication capabilities do not change dynamically, so this procedure may be performed only upon network startup or on an infrequent basis (e.g. for troubleshooting purposes).

In 720 the mobile node selects its own role, as either backbone or ordinary node.

If the mobile node's selected role is an ordinary node (730), in 775 any connections over the backbone link are disabled. In 780 the mobile node operates as ordinary node (the details of which are not described for the current figure).

If the mobile node's selected role is a backbone node (730), in 740 the mobile node identifies its one-hop neighbors and in 750 determines if any of these one-hop neighbors is a satellite-capable backbone node.

If one or more neighboring satellite-capable backbone nodes are identified, in 760 the mobile node connects to the identified nodes by satellite communication (if in accordance with the current routing protocol). Note that these connection(s) may have already been established during prior operation.

In 770 the mobile node establishes wireless connections with mobile backbone nodes over the backbone link (if in accordance with the current routing protocol). Note again that these connections may have already been established during prior operation.

Other actions may be performed as required for communication between with ordinary nodes.

FIGS. 8-13, described below, present methods of node operation in accordance with respective embodiments of the present invention.

Figure 8:
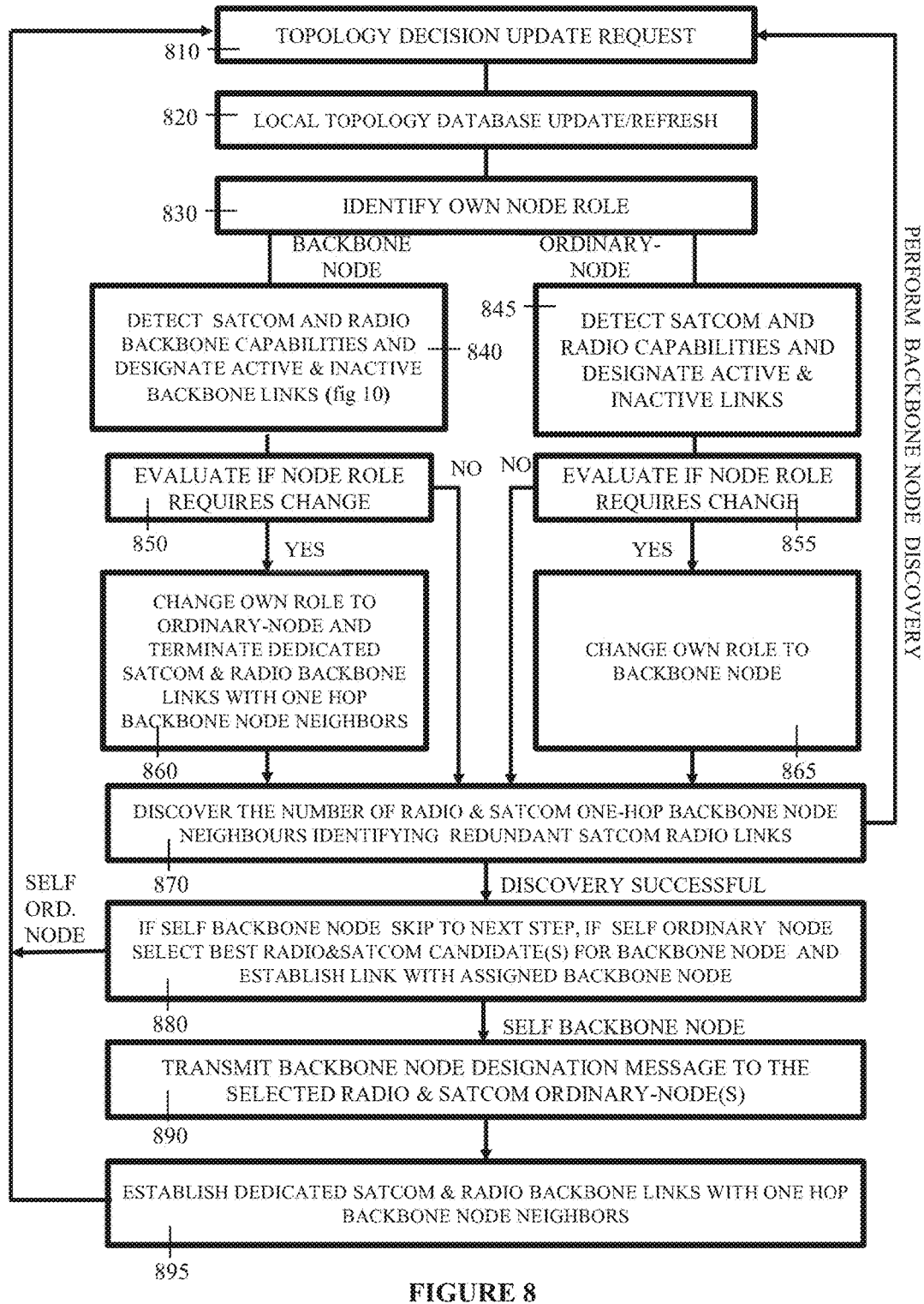
FIGS. 8, 9, 10, 11, 12 and 13 are simplified flowcharts of methods of node operation, in accordance with respective embodiments of the present invention.

Reference is now made to FIG. 8 which is a simplified flowchart of a method for operating a node in a MARSNET, in accordance with embodiments of the present invention. In 810 the node receives a topology decision update request. This initiates the node's procedure to identify current topology and determine its own operation mode and manner of communication within the network. In 820 the node refreshes its local topology database. In 830 the node determines its current mode of operation.

If the node is currently operating as a backbone node, the node performs 840-860. In 840 the node's backbone capabilities are determined, in satellite and/or wireless transmission. The node also designates backbone links as either active or inactive (see FIG. 10 for more detail). In 850 the node evaluates whether its role should be changed. This decision may be based on factors such as the updated topology data, node capabilities, data transfer requirements and so forth. If the role should be switched, in 860 the node changes its designation to ordinary node and disables its dedicated connections within the backbone link (for both satellite and wireless mobile communications). Otherwise the node continues operation as a backbone node. Connections with one-hop ordinary nodes may be retained, established or terminated based on the current network topology and routing.

If the node is currently operating as an ordinary node, the node performs 845-865. In 845 the node's communication capabilities are determined, in satellite and/or wireless transmission. The node also designates links as either active or inactive. In 855 the node evaluates whether its role should be changed. This decision may be based on factors such as the updated topology data, node capabilities, data transfer requirements and so forth. If the role should be switched, in 865 the node changes its designation to backbone node. Otherwise the node continues operation as an ordinary node. Connections with one-hop ordinary nodes may be retained, established or terminated based on the current network topology and routing.

Once the node's current mode is selected and the appropriate links are active, both types of nodes perform 870. In 870 the number of one-hop backbone node neighbors (both mobile and satellite) are discovered. Redundant links are identified. When designated in ordinary mode, the node performs 880 by selecting a respective backbone node and establishing connection(s) with the selected node, and returns to 810. When in backbone mode, 880 is omitted. In 890 a backbone node designation message is transmitted to selected ordinary nodes. In 895 the node establishes dedicated backbone links to one-hope backbone node neighbors and returns to 810.

Backbone node discovery may be performed after 870, looping back to 810.

Figure 9:
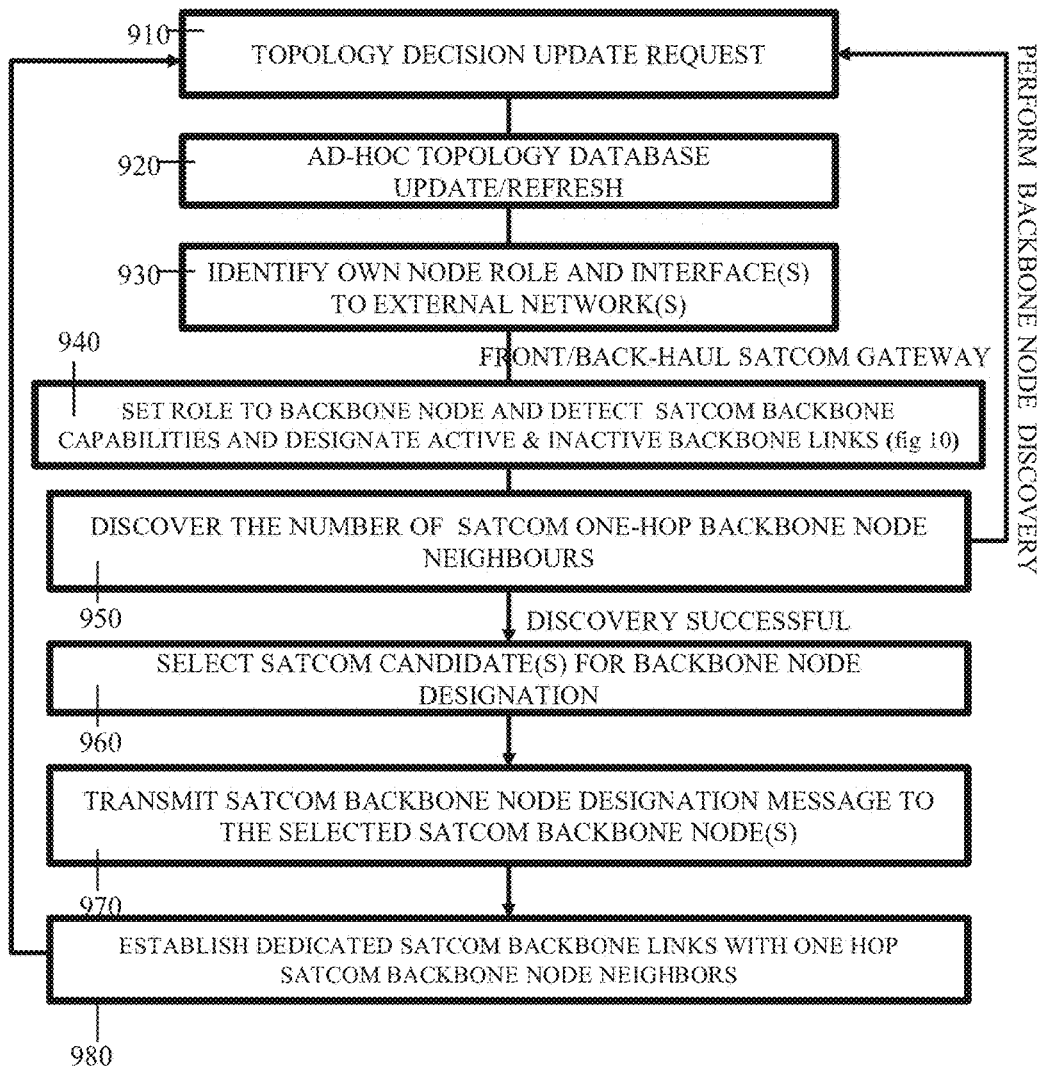

Reference is now made to FIG. 9, which is a simplified flowchart of a method for operating a Front/Back-Haul satellite communication gateway node in a MARSNET, according to embodiments of the present invention. The present method is performed by a node operating as a gateway to external networks.

In 910 the gateway node receives a topology decision update request. In 920 the gateway node refreshes its ad-hoc local topology database. In 930, the gateway node identifies its own role and interfaces with external networks for which is serves as a gateway. In 940 the gateway node sets its own role to backbone node and the gateway node's backbone capabilities are determined. The node also designates backbone links as either active or inactive (see FIG. 10 for more detail).

In 950 the number of one-hop backbone node neighbors with satellite communication capabilities are discovered. In 960 candidates are selected as backbone nodes. In 970 a satellite-communication backbone node designation message is transmitted to selected backbone nodes with satellite communication capabilities. In 980 dedicated satellite-communication backbone links are established with one-hop backbone node neighbors and returns to 910.

Figure 10:
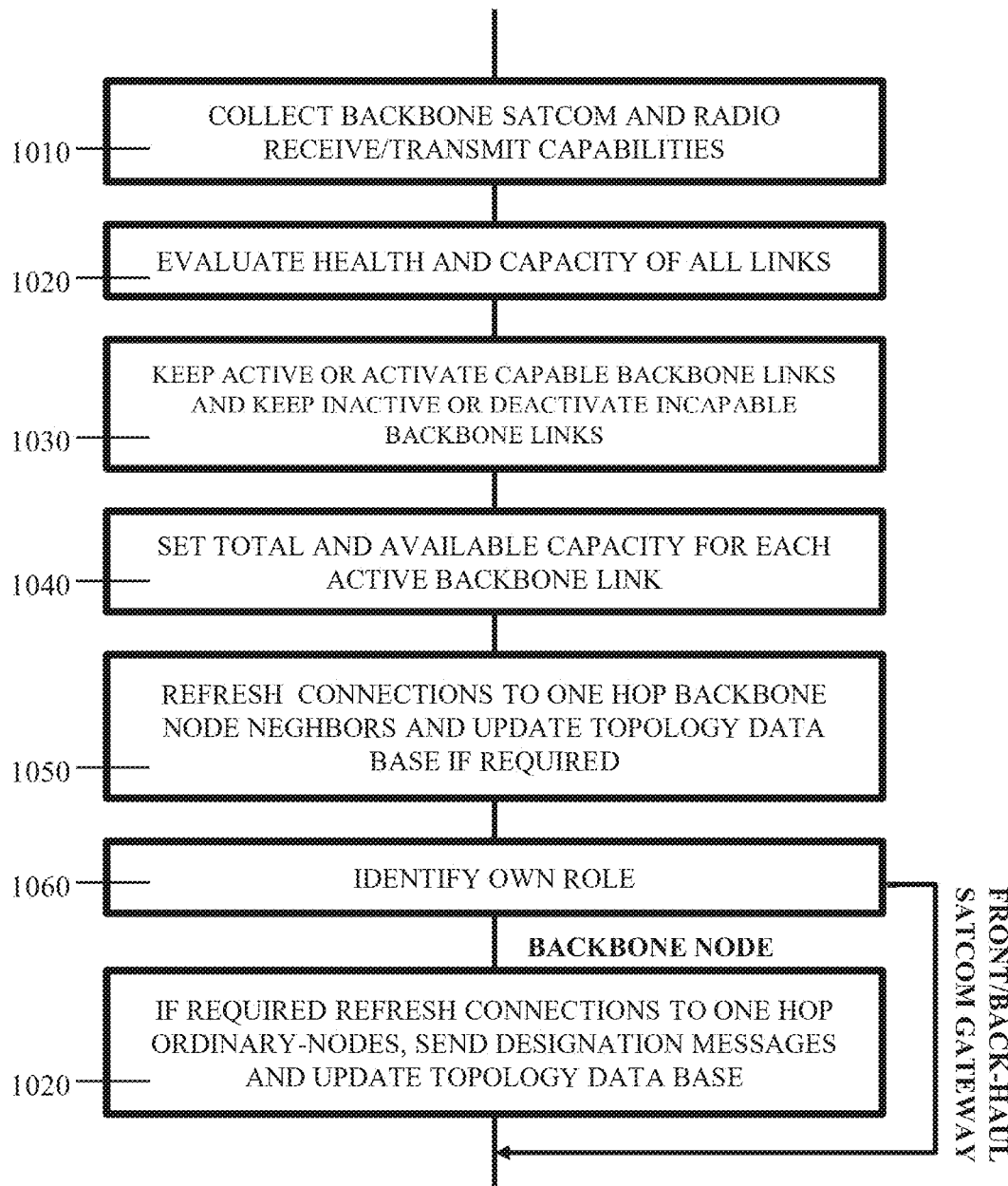

Reference is now made to FIG. 10, which is a simplified flowchart of a method for detecting satellite and mobile link backbone capabilities and of designating active and inactive backbone links, according to embodiments of the present invention. In some embodiments the method of FIG. 10 is utilized for performing 840 in FIG. 8 and/or 940 in FIG. 9.

In 1010 the receive/transmit capabilities and qualities of the MARSNET satellite and mobile node interfaces are collected. In 1020 the health and capacity of all links is evaluated. This may serve to identify mobile nodes which have moved out of the MARSNET. This may serve to identify mobile nodes which have moved out of the MARSNET and/or other node movements and/or topographic changes may have weakened or strengthened some links, thereby requiring link adjustments (e.g. transmit power increase/decrease, bandwidth capacity increase/decrease and others). In 1030 backbone links are established (or retained) with capable backbone nodes. Inactive links may be retained or deactivated as required by network protocol. In 1050, connections to one-hop backbone nodes are refreshed and the topology database is updated if required. In 1060 the node determines its own role. If the node is operating as a backbone node, connections to one-hop ordinary node neighbors are refreshed as needed, status designation messages are sent as needed and the topology database is updated as needed. Gateway nodes may continue communication with MARSNET nodes and act as a gateway to external networks.

Figure 11:
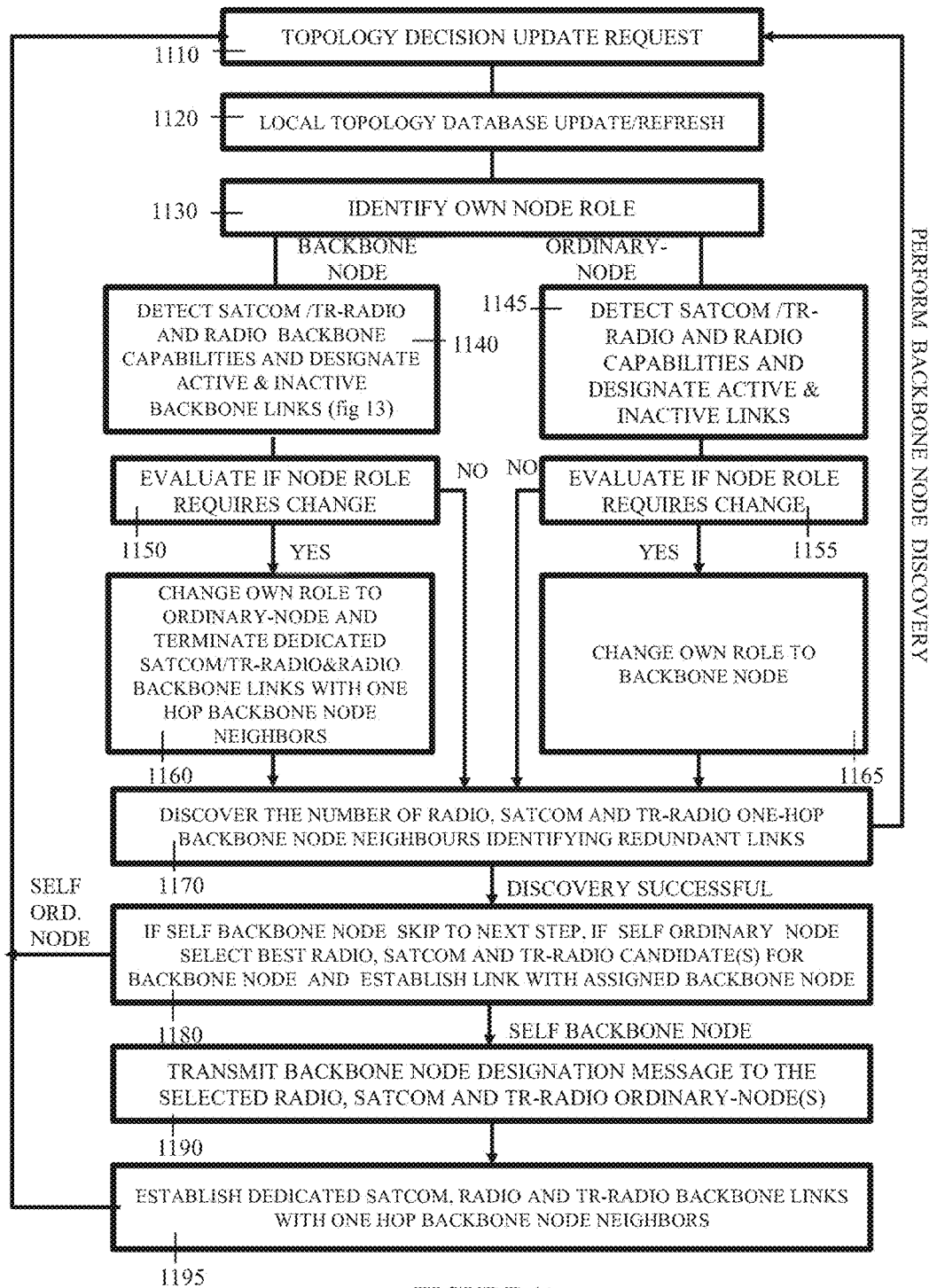

Reference is now made to FIG. 11 which is a simplified flowchart of a method for operating a node with trunking radio capabilities in a MARSNET, in accordance with embodiments of the present invention. The method of FIG. 11 corresponds substantially to the method of FIG. 8, where at least some of the MARSNET nodes include three types of communication:
   i) Mobile wireless;
   ii) SATCOM; and
   iii) Trunking links (denoted TR-RADIO) (see 1140, 1145, 1160, 1165 and 1195).

Figure 12:
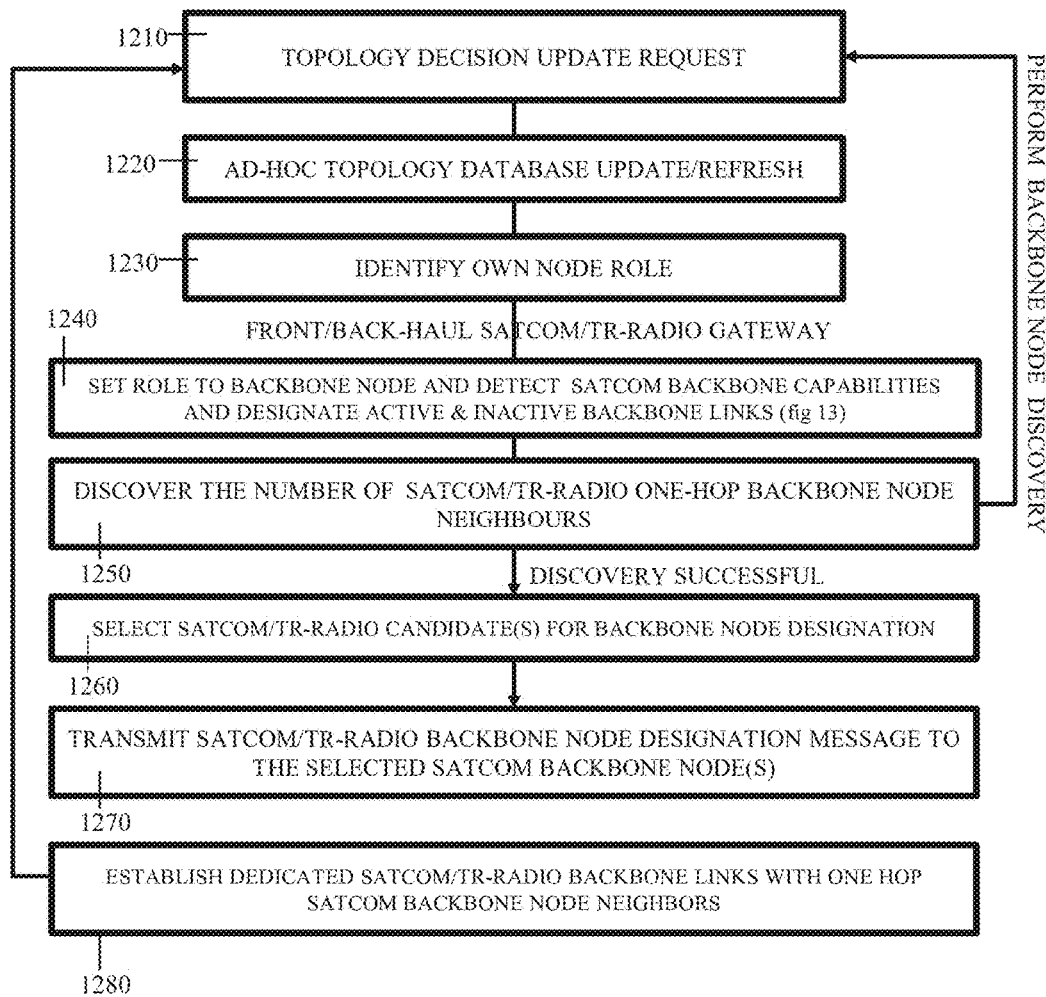

Reference is now made to FIG. 12 which is a simplified flowchart of a method for operating a node Front/Back-Haul gateway node with trunking radio capabilities in a MARSNET, in accordance with embodiments of the present invention. The present method corresponds substantially to the method of FIG. 9, expanded to incorporate the possible existence of trunking links in MARSNET nodes (see 1240-1280).

Figure 13:
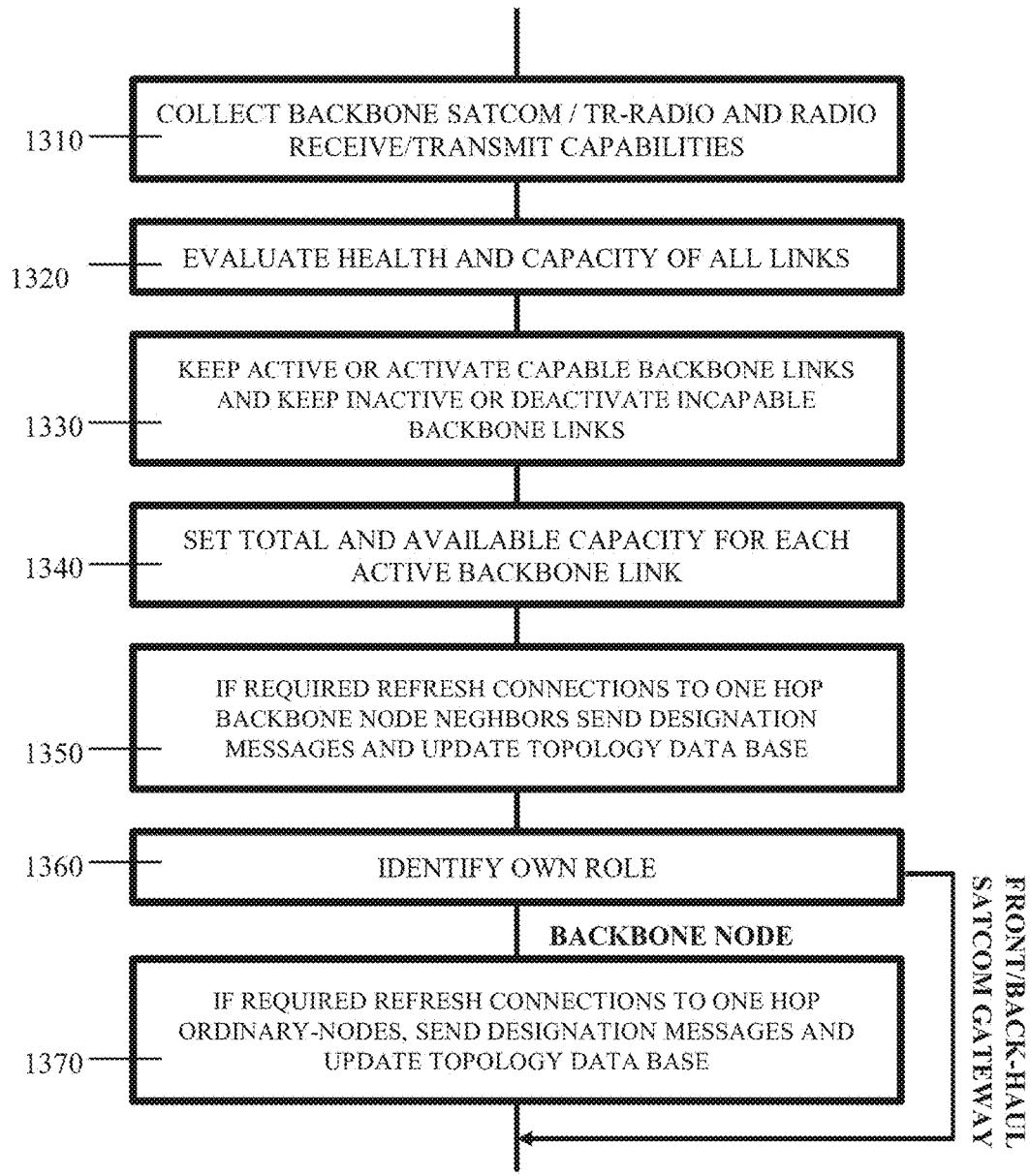

Reference is now made to FIG. 13, which is a simplified flowchart of a method for detecting satellite, mobile and trunking link backbone capabilities and of designating active and inactive backbone links, according to embodiments of the present invention. The method of FIG. 13 corresponds substantially to the method of FIG. 10, expanded to incorporate the possible existence of trunking links in MARSNET nodes (see 1310).

MARSNET System Embodiment

A MARSNET system according to embodiments of the present invention is now described. The MARSNET system includes mobile nodes with satellite communication capabilities in addition to the mobile wireless communication common to all MARSNET nodes. MARSNET nodes with satellite communication capabilities communicate over a mobile wireless link and over a satellite link, in accordance with multi-interface dynamic routing, thereby incorporating satellite communications into the MARSNET.

Nodes, with or without satellite communications capabilities, adapt dynamically in real-time to the changing MARSNET topography and communication requirements by changing their respective roles from ordinary node to backbone node and vice-versa. All nodes, both ordinary and backbone, communicate over the common mobile wireless link. Nodes operating as backbone nodes additionally communicate over a dynamically-formed backbone link. When nodes with satellite communication capabilities operate as backbone nodes, satellite communications are incorporated into the backbone network. The backbone network utilizes all of the available interfaces in such a node such wireless radio communications and satellite communications. Optionally, satellite communication is also used for backbone node to ordinary node communications and/or for ordinary node to ordinary node communication.

Some or all of the MARSNET nodes are mobile, travelling at different speeds and through various terrain conditions. Real-time decisions are made by each node dynamically according to the routing protocol, in order to accommodate the varying network topography and communication requirements.

The MARSNET routing protocol is a multi-interface ad-hoc protocol running in every node. Each node recognizes all of its available communication interfaces available and chooses which interface to utilize, dynamically in real-time, for data forwarding (and optionally control information forwarding). Each node selects the MARSNET communication interface (e.g. mobile wireless or satellite) most suitable to forward packets dynamically in real time and/or may transfer packets in parallel over multiple wireless and satellite communication interfaces, without going through an external network outside the MARSNET domain realm. The communication interface available may be selected based on some or all of: the nature of a packet (e.g. unicast, multicast, broadcast, length, bandwidth, priority, etc. . . . ). Dynamic selection of the communication interface may decrease overall MARSNET overhead and prevent the creation of bottlenecks within the overall MARSNET network.

Optionally the MARSNET includes gateway nodes with satellite communication capabilities. The gateway nodes incorporate the same multi-interface dynamic routing as the other MARSNET backbone and ordinary nodes. A gateway node may act as an ordinary node or as a backbone node, similarly to other MARSNET nodes. The gateway node role (i.e. ordinary or backbone) is determined in real time in accordance with the multi-interface routing common to all MARSNET nodes. The gateway node also incorporates a routed interface to a local external network. A gateway node may be fixed or mobile, depending on whether the external network is fixed or mobile. Optionally, the gateway node is physically adjacent to the remote external networks, and interfaces the external network to the MARSNET through the satellite communications interface. Gateway nodes interface with the external network locally through an additional wired, wireless or satellite communications interface as per the external network capabilities. The gateway node thus separates the MARSNET domain realm from the external network domain network.

The wireless and satellite communications channels may be used for some or all of:
   i) Node-to-node communications;
   ii) Backbone-to-node communications;
   iii) Backbone node to backbone node communications;
   iv) Backbone node to remote external network gateway; and
   v) Remote external gateway to backbone node.

Optionally, the MARSNET clusters itself, in which case a backbone node communicates with the nodes clustered around it with mobile wireless and/or satellite communications.

Optionally, satellite communication is used to communicate with MARSNET nodes that have moved outside the common mobile wireless interface range.

Optionally, some MARSNET nodes (mobile and/or gateway) have additional types of communication capabilities, such as long-range radio, microwave, optical, wired, etc. . . .

Mobile Ad-Hoc Networks with Multiple Forms of Wireless Communication

The abovedescribed embodiments relate to a mobile ad-hoc network which incorporates satellite-capable backbone nodes, ordinary nodes and/or front/back-haul gateway nodes.

In other embodiments, at least some mobile nodes include multiple forms of wireless communication. A first form of communication is mobile wireless communication for direct communication between MARSNET nodes (as described above). However the second form of wireless communication is not necessarily satellite communication.

By incorporating multiple communication capabilities within at least some of the network nodes, data may be dynamically routed between network nodes utilizing all available forms of communication according to a multi-interface dynamic routing. The mobile nodes are dynamically-switchable between operating as an ordinary node or as a backbone node. Typically the current mode of node operation (i.e. as backbone node or ordinary node) is selected by the node itself. A notification may then be sent to other nodes within the network.

Possible types of communication within the ad-hoc network may include (but are not limited to):

i) WLAN & WIFI (IEEE 802.11);
ii) WiMAX (IEEE 802.16);
iii) Bluetooth;
iv) Long Range Trunking LOS Radio;
v) VHF;
vi) UHF;
vii) Micro-Wave;
viii) Optical;
ix) Laser; and
x) Long-Range Point to point WiFi with special directional antennas.

Advantages of the multiple wireless communication capabilities include:

i. Incorporating a fixed (i.e. non-mobile) node into the network. This node may operate as a gateway to external networks.

ii. Links formed over the various types of communication incorporated within the MARSNET may have different data transfer capabilities. For example, if the one type of communication operates at high data rates (relative to mobile wireless communication), data transfer capacity may be significantly increased within the mobile network. Similarly the MARSNET range may be extended by including long-range communication capabilities such as trunking radio.

Mobile nodes operating as ordinary nodes communicate with selected one-hop neighboring nodes over a dynamically-formed ordinary link. Mobile nodes operating as backbone nodes additionally communicate over a dynamically-formed backbone link.

In some embodiments, the ordinary link utilizes a relatively short-range form of wireless communication while communication over the backbone link utilizes a relatively long-range form of wireless communication. The network may include at least one long-range node with long-range communication capabilities which is capable of operating as a backbone node. Mobile backbone nodes with long-range communication capabilities may communicate with the long-range node over a long-range communication link, thereby incorporating a long-range communication portion into the backbone link.

When a MARSNET node assumes the role of a backbone node and cluster-head for a cluster comprising several nodes, the backbone node may be prone to become a bottleneck within the MARSNET. This is because the cluster head transmits and receives data for multiple ordinary nodes which at time may require higher data rates. Including wireless communication with high data rate and/or range enables the cluster-head backbone node to deal with congestion peaks more efficiently, increasing overall network data payload delivery. Data throughput may also be increased by operating the node's multiple communication interfaces simultaneously.

In some embodiments, the long-range wireless communication operates at a high data-transfer capacity. The network routing protocol may take the different capabilities of the multiple links into account. For example, it may be preferred to transfer some types of data over a long-range link (e.g. to increase data transfer rate) and other types of data (e.g. with less critical delay requirements) over the short-range link. This may include cases where traffic is prioritized, and data with higher priority may be transferred over one type of communication link whereas data with a different priority is transferred over a different type of communication link. Alternately or additionally, data is routed through one communication link until the link is at full data capacity or is disconnected, at which point the data is transferred over a second communication link. Other factors which may influence which communication link is chosen include: prioritization, load balancing and switchover in case of disconnection.

To emphasize the benefits of utilizing multiple types of communication within a node, consider that short-range communication such as wireless WLAN and WIFI utilizing omnidirectional antennas are able to transmit data in a 360 degree pattern with delays below 30 msec. However data rate decreases rapidly with range and obstacles. In order to attain reliable communication over wireless WLAN and WIFI data rates for each node are typically below 1 Mbps (baseband in/out) and even lower in areas with challenging terrain (city buildings, trees, hills etc. . . . ). In contrast, satellite communication typically can transmit over thousands of kilometers, receive traffic may exceed 10 Mbps and inbound traffic is typically over 2 Mbps. Satellite communication is also less affected by obstacles but may incur delays of 500-600 msec. In the case of trunking radio, microwave and optical communications, data rates may be very high (up to 100 Mbps) and range may reach 10-30 kilometers. However these types of communications are mostly point-to-point, and are highly directional with significantly narrower effective beam angles.

Other features, described above in the context of the MARSNET, may be incorporated after adaptation, if necessary, to the multiple types of wireless communication utilized within the mobile ad-hoc network.

The ability to incorporate satellite portions into the backbone link of a mobile ad-hoc communication network greatly expands the network capabilities. The satellite communication capabilities may extend the network range, overcome topographical obstacles, increase data transfer capacity and operate as a gateway to other networks. Similar advantages may be obtained by incorporating other types of mobile, fixed and/or gateway nodes with long-range communication capabilities into the backbone link.

It is expected that during the life of a patent maturing from this application many relevant types of mobile nodes, modes of communication between mobile nodes, routing and network protocols will be developed and the scope of the corresponding terms is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A mobile ad-hoc communications network with multi-interface dynamic routing, comprising:
    a first plurality of mobile nodes configured for mobile wireless communication and without satellite communication capabilities, wherein at least some of said first plurality of mobile nodes are dynamically-switched between operating as an ordinary node or as a backbone node; and
    a second plurality of mobile nodes configured for mobile wireless communication and satellite communication, wherein at least some of said second plurality of mobile nodes are dynamically-switched between operating as an ordinary node or as a backbone node;
    wherein all of said mobile nodes communicate over a dynamically-formed ordinary communication link and wherein said mobile nodes operating as backbone nodes additionally communicate over a dynamically-formed backbone link,
    and wherein at least some ordinary nodes of said second plurality of mobile nodes and at least some backbone nodes of said second plurality of mobile nodes can communicate by both mobile wireless communication and satellite communication in accordance with an ad-hoc multi-interface dynamic routing which routes data between said mobile nodes by mobile wireless communication and by satellite communication in accordance with respective communication capabilities of said mobile nodes, so as to incorporate satellite communications into said network.

2. A network according to claim 1, wherein said multi-interface dynamic routing routes data between said backbone nodes over said backbone link by mobile wireless communication and by satellite communication, so as to incorporate satellite communications into said backbone link.

3. A network according to claim 2, further comprising a node on-board a satellite, configured for satellite communication with said mobile nodes in accordance with said multi-interface dynamic routing.

4. A network according to claim 1, wherein said mobile wireless communication capabilities enable direct communication between said mobile nodes.

5. A network according to claim 1, wherein said ad-hoc multi-interface dynamic routing routes data between a backbone node of said second plurality of mobile nodes and an ordinary node of said second plurality of mobile nodes by direct satellite communication over said ordinary communication link.

6. A network according to claim 1, wherein said ad-hoc multi-interface dynamic routing routes data between a pair of ordinary nodes of said second plurality of mobile nodes by direct satellite communication over said ordinary communication link.

7. A network according to claim 1, wherein selection of a respective mobile node operation as ordinary or backbone is performed dynamically in accordance with a current condition of said network.

8. A network according to claim 7, wherein said mobile node is configured for dynamic self-selection of said mobile node operation as ordinary or backbone.

9. A network according to claim 1, wherein said multi-interface dynamic routing routes data between backbone nodes of topographically separate portions of said network by satellite communication.

10. A network according to claim 1, further comprising at least one gateway node having satellite communication capabilities, configured for operation as a gateway between said mobile nodes and an external network in accordance with said multi-interface dynamic routing.

11. A network according to claim 10, wherein said gateway node is a fixed node configured for communication with mobile backbone nodes by said satellite communication.

12. A network according to claim 10, wherein said gateway node is a mobile node having satellite communication capabilities, configured for operation as a gateway between said mobile nodes and a mobile external network in accordance with said multi-interface dynamic routing.

13. A network according to claim 1, wherein said mobile backbone nodes are in single-hop communication with respective dynamically changing sets of ordinary nodes.

14. A network according to claim 13, wherein a backbone node and said respective set of ordinary nodes are configured as a cluster.

15. A network according to claim 1, wherein data sent from an originating node to a destination node is forwarded over said backbone link, so as to reduce a number of hops required for transmission of data from said originating node to said destination node.

16. A network according to claim 1, wherein, for a node having satellite communication capabilities, said multi-interface dynamic routing routes data simultaneously by mobile wireless communication and by satellite communication.

17. A network according to claim 1, wherein at least one of said mobile nodes comprises:
   a topology processor, configured for monitoring network topology and routing data transmission in accordance with said multi-interface dynamic routing;
   a wireless transceiver in association with said topology processor, configured for direct communication with others of said mobile nodes having mobile wireless communication capabilities; and
   a satellite transceiver in association with said topology processor, configured for satellite communication with others of said mobile nodes having satellite communication capabilities.

18. A network according to claim 17, wherein said topology processor is configured to select current node operation as an ordinary node or as a backbone node.

19. A network according to claim 17, wherein said topology processor comprises a network routing monitor configured for maintaining a routing protocol between network nodes.

20. A network according to claim 17, wherein said topology processor comprises a backbone routing monitor configured for maintaining a routing protocol between backbone nodes of said network.

21. A network according to claim 17, wherein said topology processor comprises a local routing monitor configured for maintaining a routing protocol within a cluster of nodes.

22. A mobile node for communicating within a mobile ad-hoc network, said mobile node having both mobile wireless and satellite communication capabilities, said network being for communication between multiple mobile nodes over both an ordinary communication link and a backbone communication link in accordance with a multi-interface dynamic network routing, the node comprising:
   a topology processor, configured for monitoring network topology and for routing data transmission by said node in accordance with an ad-hoc multi-interface dynamic routing which routes data by mobile wireless communication and by satellite communication in accordance with respective communication capabilities of other nodes of said mobile ad-hoc network;
   a wireless transceiver in association with said topology processor, configured for direct communication with others of said mobile nodes by mobile wireless communication; and
   a satellite transceiver in association with said topology processor, configured for satellite communication with mobile nodes over a satellite link,
   said mobile node being self-selecting between operation as an ordinary node and as a backbone node, wherein:
   during operation as a backbone node, said mobile node can communicate by mobile wireless communication and by satellite communication over both said ordinary communication link and said backbone communication link, and
   during operation as an ordinary node, said mobile node can communicate by both mobile wireless communication and by satellite communication over said ordinary communication link and disables communication over said backbone communication link.

23. A method for node self-management of a mobile node having both mobile wireless and satellite communication capabilities in a mobile ad-hoc communications network with multi-interface dynamic routing, wherein said network comprises a plurality of mobile nodes, the method comprising:
   determining respective node communication capabilities of other nodes in said network, said communication capabilities comprising at least one of mobile wireless communication and satellite communication;
   alternately operating said mobile node in backbone operating mode and in ordinary operating mode, said operating mode being selected in accordance with said communication capabilities and current network topology, wherein:
   operating said mobile node in backbone operating mode comprise:
      identifying one-hop neighboring backbone nodes and respective communication capabilities of said neighboring backbone nodes;
      establishing communication over a satellite portion of a backbone link to one-hop satellite-capable backbone nodes; and
      establishing communication over a mobile wireless portion of said backbone link to others of said identified one-hop backbone nodes; and
   operating said mobile node in ordinary operating mode comprises establishing communication over a satellite portion of an ordinary link to satellite-capable mobile nodes and establishing mobile wireless communication over a mobile wireless portion of said ordinary link with one-hop mobile nodes in accordance with a current ad-hoc multi-interface dynamic routing.

24. A method according to claim 23, further comprising routing data by said node using mobile wireless communication and satellite communication, wherein for each data packet said multi-interface dynamic routing respectively selects mobile wireless communication or satellite communication in accordance with at least one of: network topography and data type.

25. A method according to claim 23, further comprising:
   during ordinary mobile node operation, disabling communication over said backbone link.

26. A method according to claim 23, further comprising:
   during ordinary mobile node operation, establishing direct satellite wireless communication with a satellite-capable ordinary mobile node in accordance with said current dynamic routing.

27. A method according to claim 23, further comprising dynamically updating said network topology.

28. A method according to claim 23, further comprising notifying other network nodes of a current node status.

29. A mobile ad-hoc communications network with multi-interface dynamic routing, comprising:
   a plurality of mobile nodes configured for communication over a mobile wireless link in accordance with a multi-interface dynamic routing, each of said mobile nodes being configured for communication by a first form of wireless communications, and at least two of said mobile nodes being configured for communication by both said first form of wireless communication and a second form of wireless communication, said first form and said second form having differing respective communication capabilities, a plurality of said mobile nodes being dynamically-switchable between operation as an ordinary node or as a backbone node, wherein said mobile nodes communicate with one-hop neighboring nodes over a dynamically-formed ordinary communication link and said mobile nodes operating as backbone nodes additionally communicate over a dynamically-formed backbone link;

and wherein data transfer over said ordinary communication link and over said backbone link utilizes both of said first and second forms of wireless communication in accordance with said multi-interface dynamic routing and respective forms of communication of said mobile nodes, so as to incorporate at least two forms of wireless communication into said network.

30. A network according to claim 29, wherein said first and second forms of communication have different respective data-transfer capacities.

31. A network according to claim 30, wherein said multi-interface dynamic routing of said network is in accordance with data transfer requirements of transmitted data and with said data transfer capabilities of said first and second forms of wireless communication.

32. A network according to claim 29, wherein said first form of wireless communication is for direct communication between said mobile nodes.

33. A network according to claim 29, further comprising at least one gateway node configured for operation as a gateway between said mobile nodes and an external network in accordance with said multi-interface dynamic routing.

34. A network according to claim 33, wherein said gateway node is a fixed node is configured for communication with mobile backbone nodes over said backbone link.

35. A network according to claim 33, wherein said gateway node is a mobile node configured for operation as a gateway between said mobile nodes and a mobile external network in accordance with said multi-interface dynamic routing.

36. A network according to claim 29, wherein at least two of said mobile nodes further comprise satellite communication capabilities and communicate over said network by satellite communications in accordance with said multi-interface dynamic routing.

* * * * *